United States Patent
Karsikas et al.

(10) Patent No.: US 12,551,197 B2
(45) Date of Patent: Feb. 17, 2026

(54) TECHNIQUES FOR PREDICTING MENSTRUAL CYCLE ONSET

(71) Applicant: Oura Health Oy, Oulu (FI)

(72) Inventors: Mari Pauliina Karsikas, Oulu (FI); Heli Tuulia Koskimäki, Oulu (FI); Johanna Leena Kyllikki Still, Oulu (FI); Hannu Olavi Kinnunen, Oulu (FI); Nina Thigpen, Jersey City, NJ (US)

(73) Assignee: Oura Health Oy, Oulu (FI)

( * ) Notice: Subject to any disclaimer, the term of this patent is extended or adjusted under 35 U.S.C. 154(b) by 0 days.

(21) Appl. No.: 17/894,315

(22) Filed: Aug. 24, 2022

(65) Prior Publication Data

US 2023/0061823 A1 Mar. 2, 2023

Related U.S. Application Data

(60) Provisional application No. 63/238,944, filed on Aug. 31, 2021.

(51) Int. Cl.
*A61B 10/00* (2006.01)
*A61B 5/00* (2006.01)

(52) U.S. Cl.
CPC ........ *A61B 10/0012* (2013.01); *A61B 5/6802* (2013.01); *A61B 5/7275* (2013.01); *A61B 5/7475* (2013.01); *A61B 2010/0019* (2013.01)

(58) Field of Classification Search
CPC . A61B 10/0012; A61B 5/6802; A61B 5/7275; A61B 5/7475; A61B 2010/0019
See application file for complete search history.

(56) References Cited

U.S. PATENT DOCUMENTS

| | | | |
|---|---|---|---|
| 2008/0058773 A1* | 3/2008 | John | A61N 1/37235 604/891.1 |
| 2010/0191696 A1* | 7/2010 | Lee | A61B 10/0012 706/52 |
| 2015/0119749 A1* | 4/2015 | Graf | A61B 10/0012 600/549 |
| 2016/0066894 A1* | 3/2016 | Barton-Sweeney | A61B 10/0012 600/301 |
| 2018/0042540 A1* | 2/2018 | Kinnunen | A61B 5/02433 |
| 2019/0110692 A1* | 4/2019 | Pardey | A61B 5/7225 |

* cited by examiner

*Primary Examiner* — Andrey Shostak
(74) *Attorney, Agent, or Firm* — Holland & Hart LLP

(57) ABSTRACT

Methods, systems, and devices for menstrual cycle onset prediction are described. The method may include receiving physiological data associated with a user from a wearable device, the physiological data including at least temperature data. The method may include fitting the received temperature data to a trigonometric or polynomial function including a plurality of features and calculating a duration between the plurality of features and a corresponding plurality of menstrual cycle onset days. The method may include estimating a future menstrual cycle onset day that the user experiences a first day of a menstrual cycle based on applying the duration to a most recent feature of the trigonometric or polynomial function. In some cases, the method may include causing a graphical user interface of a user device to display an indication of the estimated future menstrual cycle onset day.

20 Claims, 12 Drawing Sheets

TECHNIQUES FOR PREDICTING MENSTRUAL CYCLE ONSET

CROSS REFERENCE

The present Application for Patent claims the benefit of U.S. Provisional Patent Application No. 63/238,944 by KARSIKAS et al., entitled "TECHNIQUES FOR PREDICTING MENSTRUAL CYCLE ONSET," filed Aug. 31, 2021, assigned to the assignee thereof, and expressly incorporated by reference herein.

FIELD OF TECHNOLOGY

The following relates to wearable devices and data processing, including techniques for predicting menstrual cycle onset.

BACKGROUND

Some wearable devices may be configured to collect data from users associated with body temperature and heart rate. For example, some wearable devices may be configured to detect cycles associated with women's health. However, conventional cycle detection techniques implemented by wearable devices are deficient.

DETAILED DESCRIPTION

Figure 1:
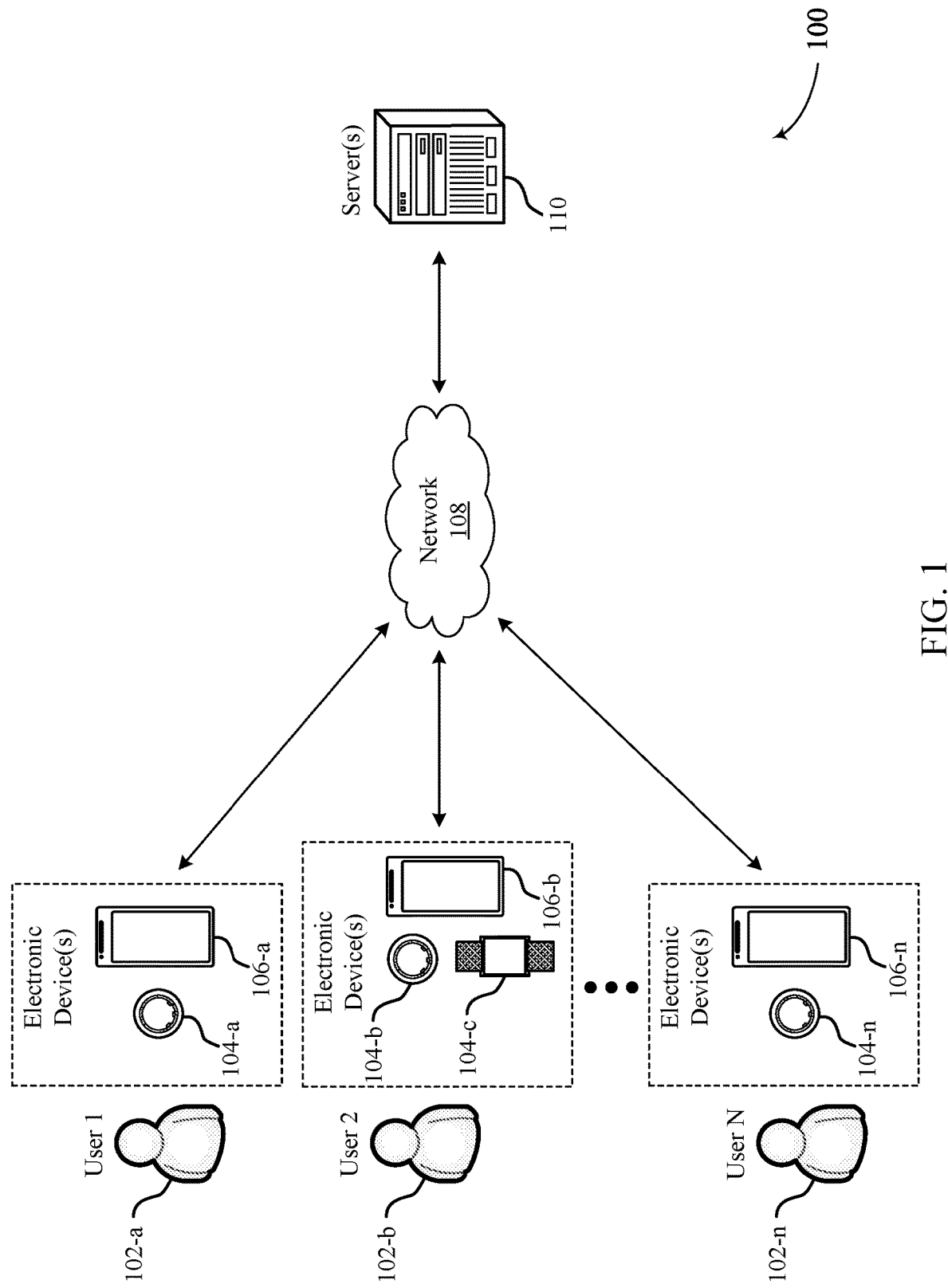
FIG. 1 illustrates an example of a system that supports techniques for predicting menstrual cycle onset in accordance with aspects of the present disclosure.

Some wearable devices may be configured to collect physiological data from users, including temperature data, heart rate data, and the like. Acquired physiological data may be used to analyze the user's movement and other activities, such as sleeping patterns. Many users have a desire for more insight regarding their physical health, including their sleeping patterns, activity, and overall physical well-being. In particular, many users may have a desire for more insight regarding women's health, including menstruation, ovulation, fertility and/or pregnancy. However, typical cycle tracking or women's health devices and applications lack the ability to provide robust prediction and insight for several reasons.

First, typical cycle prediction applications require users to manually take their temperature with a device at a discrete time each day. This single temperature data point may not provide sufficient context to accurately capture or predict the true temperature variations indicative of woman's health cycle patterns, and may be difficult to accurately capture given the sensitivity of the measuring device to user movement or exertion. Second, even for devices that are wearable or that take a user's temperature more frequently throughout the day, typical devices and applications lack the ability to collect other physiological, behavioral, or contextual inputs from the user that can be combined with the measured temperature to more comprehensively understand the complete set of physiological contributors to a woman's cycle.

Aspects of the present disclosure are directed to techniques for detecting a menstrual cycle onset. In particular, computing devices of the present disclosure may receive physiological data including temperature data from the wearable device associated with the user and fit the received temperature data to a trigonometric or polynomial function including a plurality of features. For example, aspects of the present disclosure may calculate a duration between the plurality of features and a corresponding plurality of menstrual cycle onset days. As such, aspects of the present disclosure estimate a future menstrual cycle onset day based on applying the duration to a most recent feature of the trigonometric or polynomial function. From the perspective of a user, the menstrual tracking prediction (e.g., detection of the menstrual cycle onset) may appear as a prediction of the user's menstrual cycle, or, in other words, may indicate that the user is experiencing a first day of a menstrual cycle (e.g., menstruation). In some implementations, the computing devices may also detect or predict the luteal phase and/or ovulation phase of a user.

For the purposes of the present disclosure, the term "menstrual cycle" may be used to refer to a user's cycle including a series of natural changes in hormone production and the structures of the uterus and ovaries of the female reproductive system that make pregnancy possible. A menstrual cycle begins with the first day of the user's period, or menstruation, and starts over again when the next period begins. Menstruation is a woman's monthly bleeding, often called a period. For example, a user may be experiencing a first day of a menstrual cycle when the user's body discards the monthly buildup of the lining of the uterus. The menstrual cycle may include menstruation, an ovarian cycle, a uterine cycle, a follicular phase, a luteal phase, a sub-phase of any one of the menstruation, the ovarian cycle, the uterine cycle, the follicular phase, and/or the luteal phase, or a combination thereof. In some cases, the menstrual cycle phase may representative of a reproductive cycle and/or a sub-phase of the reproductive cycle.

Some aspects of the present disclosure are directed to the detection of the menstrual cycle onset before the user experiences symptoms and effects of the menstrual cycle onset. However, techniques described herein may also be used to detect the menstrual cycle onset in cases where the user does not become symptomatic, or does not become aware of their symptoms. In some implementations, the computing devices may be able to detect the luteal phase of the menstrual cycle using a temperature sensor. In such cases, the computing devices may estimate the retrospective dates of period onset and ovulation without the user tagging or labeling these events.

In conventional systems, the user may tag or label events associated with the menstrual cycle and calculate the future menstrual cycle onset day based on an average length between menstrual cycles. In other systems, the retrospective events (e.g., period and ovulation) may be estimated using basal body temperature measured once daily (e.g., in the morning) with an oral thermometer. Techniques described herein may continuously collect the physiological data from the user based on arterial blood flow. In some implementations, the computing devices may sample the user's temperature continuously throughout the day and night. Sampling at a sufficient rate (e.g., one sample per minute) throughout the day may provide sufficient temperature data for analysis described herein.

In some cases, continuous temperature measurement at the finger may capture temperature fluctuations (e.g., small or large fluctuations) that may not be evident in core temperature. For example, continuous temperature measurement at the finger may capture minute-to-minute or hour-to-hour temperature fluctuations that provide additional insight that may not be provided by other temperature measurements elsewhere in the body or if the user were manually taking their temperature once per day. As such, data collected by the computing devices may be used to determine when the user experiences a first day of a menstrual cycle (e.g., menstruation).

Techniques described herein may notify a user of the detected/predicted menstrual cycle onset in a variety of ways. For example, a system may cause a graphical user interface (GUI) of a user device to display a message or other notification to notify the user of the estimated future menstrual cycle onset day, and make recommendations to the user. In one example, the GUI may display a time interval that the future menstrual cycle onset day is predicted to occur and recommendations that the user prepare for a first day of a menstrual cycle based on previously input symptoms. A GUI may also include graphics/text that indicates the data used to make the detection/prediction of an upcoming menstrual cycle onset. For example, a GUI may indicate that an upcoming menstrual cycle onset has been predicted based on temperature deviations from a normal baseline. Based on the early warnings (e.g., before noticeable symptoms), a user may take early steps that may help reduce the severity of upcoming symptoms associated with the menstrual cycle onset. Additionally, a user may modify/schedule their daily activities (e.g., work and leisure time) based on the early warnings and estimated future menstrual cycle onset day.

Aspects of the disclosure are initially described in the context of systems supporting physiological data collection from users via wearable devices. Additional aspects of the disclosure are described in the context of example timing diagrams and example GUIs. Aspects of the disclosure are further illustrated by and described with reference to apparatus diagrams, system diagrams, and flowcharts that relate to techniques for predicting menstrual cycle onset.

FIG. 1 illustrates an example of a system 100 that supports techniques for predicting menstrual cycle onset in accordance with aspects of the present disclosure. The system 100 includes a plurality of electronic devices (e.g., wearable devices 104, user devices 106) that may be worn and/or operated by one or more users 102. The system 100 further includes a network 108 and one or more servers 110.

The electronic devices may include any electronic devices known in the art, including wearable devices 104 (e.g., ring wearable devices, watch wearable devices, etc.), user devices 106 (e.g., smartphones, laptops, tablets). The electronic devices associated with the respective users 102 may include one or more of the following functionalities: 1) measuring physiological data, 2) storing the measured data, 3) processing the data, 4) providing outputs (e.g., via GUIs) to a user 102 based on the processed data, and 5) communicating data with one another and/or other computing devices. Different electronic devices may perform one or more of the functionalities.

Example wearable devices 104 may include wearable computing devices, such as a ring computing device (hereinafter "ring") configured to be worn on a user's 102 finger, a wrist computing device (e.g., a smart watch, fitness band, or bracelet) configured to be worn on a user's 102 wrist, and/or a head mounted computing device (e.g., glasses/goggles). Wearable devices 104 may also include bands, straps (e.g., flexible or inflexible bands or straps), stick-on sensors, and the like, that may be positioned in other locations, such as bands around the head (e.g., a forehead headband), arm (e.g., a forearm band and/or bicep band), and/or leg (e.g., a thigh or calf band), behind the ear, under the armpit, and the like. Wearable devices 104 may also be attached to, or included in, articles of clothing. For example, wearable devices 104 may be included in pockets and/or pouches on clothing. As another example, wearable device 104 may be clipped and/or pinned to clothing, or may otherwise be maintained within the vicinity of the user 102. Example articles of clothing may include, but are not limited to, hats, shirts, gloves, pants, socks, outerwear (e.g., jackets), and undergarments. In some implementations, wearable devices 104 may be included with other types of devices such as training/sporting devices that are used during physical activity. For example, wearable devices 104 may be attached to, or included in, a bicycle, skis, a tennis racket, a golf club, and/or training weights.

Much of the present disclosure may be described in the context of a ring wearable device 104. Accordingly, the terms "ring 104," "wearable device 104," and like terms, may be used interchangeably, unless noted otherwise herein. However, the use of the term "ring 104" is not to be regarded as limiting, as it is contemplated herein that aspects of the present disclosure may be performed using other wearable devices (e.g., watch wearable devices, necklace wearable device, bracelet wearable devices, earring wearable devices, anklet wearable devices, and the like).

In some aspects, user devices 106 may include handheld mobile computing devices, such as smartphones and tablet computing devices. User devices 106 may also include personal computers, such as laptop and desktop computing devices. Other example user devices 106 may include server computing devices that may communicate with other electronic devices (e.g., via the Internet). In some implementations, computing devices may include medical devices, such as external wearable computing devices (e.g., Holter monitors). Medical devices may also include implantable medical devices, such as pacemakers and cardioverter defibrillators. Other example user devices 106 may include home computing devices, such as internet of things (IoT) devices (e.g., IoT devices), smart televisions, smart speakers, smart displays (e.g., video call displays), hubs (e.g., wireless communication hubs), security systems, smart appliances (e.g., thermostats and refrigerators), and fitness equipment.

Some electronic devices (e.g., wearable devices 104, user devices 106) may measure physiological parameters of respective users 102, such as photoplethysmography waveforms, continuous skin temperature, a pulse waveform, respiration rate, heart rate, heart rate variability (HRV), actigraphy, galvanic skin response, pulse oximetry, and/or other physiological parameters. Some electronic devices that measure physiological parameters may also perform some/all of the calculations described herein. Some electronic devices may not measure physiological parameters, but may perform some/all of the calculations described herein. For example, a ring (e.g., wearable device 104), mobile device application, or a server computing device may process received physiological data that was measured by other devices.

In some implementations, a user 102 may operate, or may be associated with, multiple electronic devices, some of which may measure physiological parameters and some of which may process the measured physiological parameters. In some implementations, a user 102 may have a ring (e.g., wearable device 104) that measures physiological parameters. The user 102 may also have, or be associated with, a user device 106 (e.g., mobile device, smartphone), where the wearable device 104 and the user device 106 are communicatively coupled to one another. In some cases, the user device 106 may receive data from the wearable device 104 and perform some/all of the calculations described herein. In some implementations, the user device 106 may also measure physiological parameters described herein, such as motion/activity parameters.

For example, as illustrated in FIG. 1, a first user 102-*a* (User 1) may operate, or may be associated with, a wearable device 104-*a* (e.g., ring 104-*a*) and a user device 106-*a* that may operate as described herein. In this example, the user device 106-*a* associated with user 102-*a* may process/store physiological parameters measured by the ring 104-*a*. Comparatively, a second user 102-*b* (User 2) may be associated with a ring 104-*b*, a watch wearable device 104-*c* (e.g., watch 104-*c*), and a user device 106-*b*, where the user device 106-*b* associated with user 102-*b* may process/store physiological parameters measured by the ring 104-*b* and/or the watch 104-*c*. Moreover, an nth user 102-*n* (User N) may be associated with an arrangement of electronic devices described herein (e.g., ring 104-*n*, user device 106-*n*). In some aspects, wearable devices 104 (e.g., rings 104, watches 104) and other electronic devices may be communicatively coupled to the user devices 106 of the respective users 102 via Bluetooth, Wi-Fi, and other wireless protocols.

In some implementations, the rings 104 (e.g., wearable devices 104) of the system 100 may be configured to collect physiological data from the respective users 102 based on arterial blood flow within the user's finger. In particular, a ring 104 may utilize one or more light emitting diodes (LEDs) (e.g., red LEDs, green LEDs) that emit light on the palm-side of a user's finger to collect physiological data based on arterial blood flow within the user's finger. In some implementations, the ring 104 may acquire the physiological data using a combination of both green and red LEDs. The physiological data may include any physiological data known in the art including, but not limited to, temperature data, accelerometer data (e.g., movement/motion data), heart rate data, HRV data, blood oxygen level data, or any combination thereof.

The use of both green and red LEDs may provide several advantages over other solutions, as red and green LEDs have been found to have their own distinct advantages when acquiring physiological data under different conditions (e.g., light/dark, active/inactive) and via different parts of the body, and the like. For example, green LEDs have been found to exhibit better performance during exercise. Moreover, using multiple LEDs (e.g., green and red LEDs) distributed around the ring 104 has been found to exhibit superior performance as compared to wearable devices that utilize LEDs that are positioned close to one another, such as within a watch wearable device. Furthermore, the blood vessels in the finger (e.g., arteries, capillaries) are more accessible via LEDs as compared to blood vessels in the wrist. In particular, arteries in the wrist are positioned on the bottom of the wrist (e.g., palm-side of the wrist), meaning only capillaries are accessible on the top of the wrist (e.g., back of hand side of the wrist), where wearable watch devices and similar devices are typically worn. As such, utilizing LEDs and other sensors within a ring 104 has been found to exhibit superior performance as compared to wearable devices worn on the wrist, as the ring 104 may have greater access to arteries (as compared to capillaries), thereby resulting in stronger signals and more valuable physiological data. In some cases, the system 100 may be configured to collect physiological data from the respective users 102 based on blood flow diffused into a microvascular bed of skin with capillaries and arterioles. For example, the system 100 may collect PPG data based on a measured amount of blood diffused into the microvascular system of capillaries and arterioles.

The electronic devices of the system 100 (e.g., user devices 106, wearable devices 104) may be communicatively coupled to one or more servers 110 via wired or wireless communication protocols. For example, as shown in FIG. 1, the electronic devices (e.g., user devices 106) may be communicatively coupled to one or more servers 110 via a network 108. The network 108 may implement transfer control protocol and internet protocol (TCP/IP), such as the Internet, or may implement other network 108 protocols. Network connections between the network 108 and the respective electronic devices may facilitate transport of data via email, web, text messages, mail, or any other appropriate form of interaction within a computer network 108. For example, in some implementations, the ring 104-*a* associated with the first user 102-*a* may be communicatively coupled to the user device 106-*a*, where the user device 106-*a* is communicatively coupled to the servers 110 via the network 108. In additional or alternative cases, wearable devices 104 (e.g., rings 104, watches 104) may be directly communicatively coupled to the network 108.

The system 100 may offer an on-demand database service between the user devices 106 and the one or more servers 110. In some cases, the servers 110 may receive data from the user devices 106 via the network 108, and may store and analyze the data. Similarly, the servers 110 may provide data to the user devices 106 via the network 108. In some cases, the servers 110 may be located at one or more data centers. The servers 110 may be used for data storage, management, and processing. In some implementations, the servers 110 may provide a web-based interface to the user device 106 via web browsers.

In some aspects, the system 100 may detect periods of time that a user 102 is asleep, and classify periods of time during that the user 102 is asleep into one or more sleep stages (e.g., sleep stage classification). For example, as shown in FIG. 1, User 102-*a* may be associated with a wearable device 104-*a* (e.g., ring 104-*a*) and a user device 106-*a*. In this example, the ring 104-*a* may collect physiological data associated with the user 102-*a*, including temperature, heart rate, HRV, respiratory rate, and the like. In some aspects, data collected by the ring 104-*a* may be input to a machine learning classifier, where the machine learning classifier is configured to determine periods of time that the user 102-*a* is (or was) asleep. Moreover, the machine learning classifier may be configured to classify periods of time into different sleep stages, including an awake sleep stage, a rapid eye movement (REM) sleep stage, a light sleep stage (non-REM (NREM)), and a deep sleep stage (NREM). In some aspects, the classified sleep stages may be displayed to the user 102-*a* via a GUI of the user device 106-*a*. Sleep stage classification may be used to provide feedback to a user 102-*a* regarding the user's sleeping patterns, such as recommended bedtimes, recommended wake-up times, and the like. Moreover, in some implementations, sleep stage classification techniques described herein may be used to calculate scores for the respective user, such as Sleep Scores, Readiness Scores, and the like.

In some aspects, the system 100 may utilize circadian rhythm-derived features to further improve physiological data collection, data processing procedures, and other techniques described herein. The term circadian rhythm may refer to a natural, internal process that regulates an individual's sleep-wake cycle, that repeats approximately every 24 hours. In this regard, techniques described herein may utilize circadian rhythm adjustment models to improve physiological data collection, analysis, and data processing. For example, a circadian rhythm adjustment model may be input into a machine learning classifier along with physiological data collected from the user 102-*a* via the wearable device 104-*a*. In this example, the circadian rhythm adjustment model may be configured to "weight," or adjust, physiological data collected throughout a user's natural, approximately 24-hour circadian rhythm. In some implementations, the system may initially start with a "baseline" circadian rhythm adjustment model, and may modify the baseline model using physiological data collected from each user 102 to generate tailored, individualized circadian rhythm adjustment models that are specific to each respective user 102.

In some aspects, the system 100 may utilize other biological rhythms to further improve physiological data collection, analysis, and processing by phase of these other rhythms. For example, if a weekly rhythm is detected within an individual's baseline data, then the model may be configured to adjust "weights" of data by day of the week. Biological rhythms that may require adjustment to the model by this method include: 1) ultradian (faster than a day rhythms, including sleep cycles in a sleep state, and oscillations from less than an hour to several hours periodicity in the measured physiological variables during wake state; 2) circadian rhythms; 3) non-endogenous daily rhythms shown to be imposed on top of circadian rhythms, as in work schedules; 4) weekly rhythms, or other artificial time periodicities exogenously imposed (e.g. in a hypothetical culture with 12 day "weeks", 12 day rhythms could be used); 5) multi-day ovarian rhythms in women and spermatogenesis rhythms in men; 6) lunar rhythms (relevant for individuals living with low or no artificial lights); and 7) seasonal rhythms.

The biological rhythms are not always stationary rhythms. For example, many women experience variability in ovarian cycle length across cycles, and ultradian rhythms are not expected to occur at exactly the same time or periodicity across days even within a user. As such, signal processing techniques sufficient to quantify the frequency composition while preserving temporal resolution of these rhythms in physiological data may be used to improve detection of these rhythms, to assign phase of each rhythm to each moment in time measured, and to thereby modify adjustment models and comparisons of time intervals. The biological rhythm-adjustment models and parameters can be added in linear or non-linear combinations as appropriate to more accurately capture the dynamic physiological baselines of an individual or group of individuals.

In some aspects, the respective devices of the system 100 may support techniques for predicting menstrual cycle onset based on data collected by a wearable device. In particular, the system 100 illustrated in FIG. 1 may support techniques for predicting menstrual cycle onset of a user 102, and causing a user device 106 corresponding to the user 102 to display an indication of the predicted menstrual cycle onset. For example, as shown in FIG. 1, User 1 (user 102-*a*) may be associated with a wearable device 104-*a* (e.g., ring 104-*a*) and a user device 106-*a*. In this example, the ring 104-*a* may collect data associated with the user 102-*a*, including temperature, heart rate, and the like. In some aspects, data collected by the ring 104-*a* may be used to estimate a future menstrual cycle that User 1 experiences a first day of a menstrual cycle (e.g., menstruation), during which User 1 experiences ovulation, during which User 1 experiences an onset of the uterine cycle, and the like. Predicting the menstrual cycle onset may be performed by any of the components of the system 100, including the ring 104-*a*, the user device 106-*a* associated with User 1, the one or more servers 110, or any combination thereof. Upon estimating the menstrual cycle onset, the system 100 may selectively cause the GUI of the user device 106-*a* to display an indication of the estimated future menstrual cycle onset day.

In some implementations, upon receiving physiological data (e.g., including temperature data), the system 100 may fit the received temperature data to a trigonometric or polynomial function. The system 200 may calculate a duration between a plurality of features of the trigonometric or polynomial function and a corresponding plurality of menstrual cycle onset days. In such cases, the system 100 may estimate the future menstrual cycle onset day based on applying the duration to a most recent feature of the trigonometric or polynomial function.

In some cases, the system 100 may prompt User 1 (e.g., via a GUI of the user device 106) to confirm whether the user 102-*a* experienced a first day of the menstrual cycle or not, and may selectively adjust Readiness Scores for the user 102-*a* based on confirmation that the user experienced a first day of the menstrual cycle. In some implementations, the system 100 may generate alerts, messages, or recommendations for User 1 (e.g., via the ring 104-*a*, user device 106-*a*, or both) based on the predicted menstrual cycle onset, where the alerts may provide insights regarding the predicted menstrual cycle onset, such as a timing and/or duration of the predicted menstrual cycle onset.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
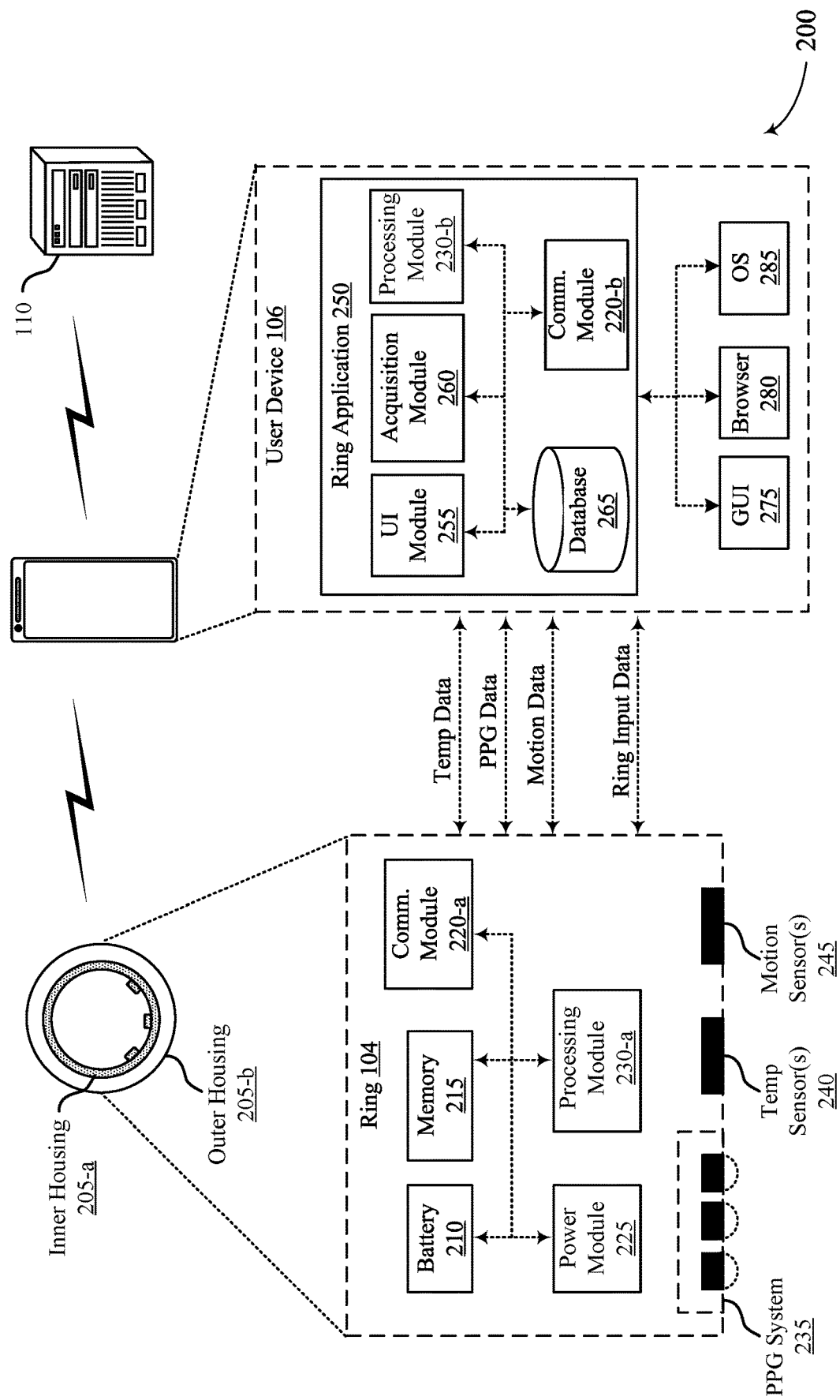
FIG. 2 illustrates an example of a system that supports techniques for predicting menstrual cycle onset in accordance with aspects of the present disclosure.

FIG. 2 illustrates an example of a system 200 that supports techniques for predicting menstrual cycle onset in accordance with aspects of the present disclosure. The system 200 may implement, or be implemented by, system 100. In particular, system 200 illustrates an example of a ring 104 (e.g., wearable device 104), a user device 106, and a server 110, as described with reference to FIG. 1.

In some aspects, the ring 104 may be configured to be worn around a user's finger, and may determine one or more user physiological parameters when worn around the user's finger. Example measurements and determinations may include, but are not limited to, user skin temperature, pulse waveforms, respiratory rate, heart rate, HRV, blood oxygen levels, and the like.

System 200 further includes a user device 106 (e.g., a smartphone) in communication with the ring 104. For example, the ring 104 may be in wireless and/or wired communication with the user device 106. In some implementations, the ring 104 may send measured and processed data (e.g., temperature data, photoplethysmogram (PPG) data, motion/accelerometer data, ring input data, and the like) to the user device 106. The user device 106 may also send data to the ring 104, such as ring 104 firmware/configuration updates. The user device 106 may process data. In some implementations, the user device 106 may transmit data to the server 110 for processing and/or storage.

The ring 104 may include a housing 205, that may include an inner housing 205-a and an outer housing 205-b. In some aspects, the housing 205 of the ring 104 may store or otherwise include various components of the ring including, but not limited to, device electronics, a power source (e.g., battery 210, and/or capacitor), one or more substrates (e.g., printable circuit boards) that interconnect the device electronics and/or power source, and the like. The device electronics may include device modules (e.g., hardware/software), such as: a processing module 230-a, a memory 215, a communication module 220-a, a power module 225, and the like. The device electronics may also include one or more sensors. Example sensors may include one or more temperature sensors 240, a PPG sensor assembly (e.g., PPG system 235), and one or more motion sensors 245.

The sensors may include associated modules (not illustrated) configured to communicate with the respective components/modules of the ring 104, and generate signals associated with the respective sensors. In some aspects, each of the components/modules of the ring 104 may be communicatively coupled to one another via wired or wireless connections. Moreover, the ring 104 may include additional and/or alternative sensors or other components that are configured to collect physiological data from the user, including light sensors (e.g., LEDs), oximeters, and the like.

The ring 104 shown and described with reference to FIG. 2 is provided solely for illustrative purposes. As such, the ring 104 may include additional or alternative components as those illustrated in FIG. 2. Other rings 104 that provide functionality described herein may be fabricated. For example, rings 104 with fewer components (e.g., sensors) may be fabricated. In a specific example, a ring 104 with a single temperature sensor 240 (or other sensor), a power source, and device electronics configured to read the single temperature sensor 240 (or other sensor) may be fabricated. In another specific example, a temperature sensor 240 (or other sensor) may be attached to a user's finger (e.g., using a clamps, spring loaded clamps, etc.). In this case, the sensor may be wired to another computing device, such as a wrist worn computing device that reads the temperature sensor 240 (or other sensor). In other examples, a ring 104 that includes additional sensors and processing functionality may be fabricated.

The housing 205 may include one or more housing 205 components. The housing 205 may include an outer housing 205-b component (e.g., a shell) and an inner housing 205-a component (e.g., a molding). The housing 205 may include additional components (e.g., additional layers) not explicitly illustrated in FIG. 2. For example, in some implementations, the ring 104 may include one or more insulating layers that electrically insulate the device electronics and other conductive materials (e.g., electrical traces) from the outer housing 205-b (e.g., a metal outer housing 205-b). The housing 205 may provide structural support for the device electronics, battery 210, substrate(s), and other components. For example, the housing 205 may protect the device electronics, battery 210, and substrate(s) from mechanical forces, such as pressure and impacts. The housing 205 may also protect the device electronics, battery 210, and substrate(s) from water and/or other chemicals.

The outer housing 205-b may be fabricated from one or more materials. In some implementations, the outer housing 205-b may include a metal, such as titanium, that may provide strength and abrasion resistance at a relatively light weight. The outer housing 205-b may also be fabricated from other materials, such polymers. In some implementations, the outer housing 205-b may be protective as well as decorative.

The inner housing 205-a may be configured to interface with the user's finger. The inner housing 205-a may be formed from a polymer (e.g., a medical grade polymer) or other material. In some implementations, the inner housing 205-a may be transparent. For example, the inner housing 205-a may be transparent to light emitted by the PPG LEDs. In some implementations, the inner housing 205-a component may be molded onto the outer housing 205-b. For example, the inner housing 205-a may include a polymer that is molded (e.g., injection molded) to fit into an outer housing 205-b metallic shell.

The ring 104 may include one or more substrates (not illustrated). The device electronics and battery 210 may be included on the one or more substrates. For example, the device electronics and battery 210 may be mounted on one or more substrates. Example substrates may include one or more printed circuit boards (PCBs), such as flexible PCB (e.g., polyimide). In some implementations, the electronics/battery 210 may include surface mounted devices (e.g., surface-mount technology (SMT) devices) on a flexible PCB. In some implementations, the one or more substrates (e.g., one or more flexible PCBs) may include electrical traces that provide electrical communication between device electronics. The electrical traces may also connect the battery 210 to the device electronics.

The device electronics, battery 210, and substrates may be arranged in the ring 104 in a variety of ways. In some implementations, one substrate that includes device electronics may be mounted along the bottom of the ring 104 (e.g., the bottom half), such that the sensors (e.g., PPG system 235, temperature sensors 240, motion sensors 245, and other sensors) interface with the underside of the user's finger. In these implementations, the battery 210 may be included along the top portion of the ring 104 (e.g., on another substrate).

The various components/modules of the ring 104 represent functionality (e.g., circuits and other components) that may be included in the ring 104. Modules may include any discrete and/or integrated electronic circuit components that implement analog and/or digital circuits capable of producing the functions attributed to the modules herein. For example, the modules may include analog circuits (e.g., amplification circuits, filtering circuits, analog/digital conversion circuits, and/or other signal conditioning circuits).

The modules may also include digital circuits (e.g., combinational or sequential logic circuits, memory circuits etc.).

The memory 215 (memory module) of the ring 104 may include any volatile, non-volatile, magnetic, or electrical media, such as a random access memory (RAM), read-only memory (ROM), non-volatile RAM (NVRAM), electrically-erasable programmable ROM (EEPROM), flash memory, or any other memory device. The memory 215 may store any of the data described herein. For example, the memory 215 may be configured to store data (e.g., motion data, temperature data, PPG data) collected by the respective sensors and PPG system 235. Furthermore, memory 215 may include instructions that, when executed by one or more processing circuits, cause the modules to perform various functions attributed to the modules herein. The device electronics of the ring 104 described herein are only example device electronics. As such, the types of electronic components used to implement the device electronics may vary based on design considerations.

The functions attributed to the modules of the ring 104 described herein may be embodied as one or more processors, hardware, firmware, software, or any combination thereof. Depiction of different features as modules is intended to highlight different functional aspects and does not necessarily imply that such modules must be realized by separate hardware/software components. Rather, functionality associated with one or more modules may be performed by separate hardware/software components or integrated within common hardware/software components.

The processing module 230-a of the ring 104 may include one or more processors (e.g., processing units), microcontrollers, digital signal processors, systems on a chip (SOCs), and/or other processing devices. The processing module 230-a communicates with the modules included in the ring 104. For example, the processing module 230-a may transmit/receive data to/from the modules and other components of the ring 104, such as the sensors. As described herein, the modules may be implemented by various circuit components. Accordingly, the modules may also be referred to as circuits (e.g., a communication circuit and power circuit).

The processing module 230-a may communicate with the memory 215. The memory 215 may include computer-readable instructions that, when executed by the processing module 230-a, cause the processing module 230-a to perform the various functions attributed to the processing module 230-a herein. In some implementations, the processing module 230-a (e.g., a microcontroller) may include additional features associated with other modules, such as communication functionality provided by the communication module 220-a (e.g., an integrated Bluetooth Low Energy transceiver) and/or additional onboard memory 215.

The communication module 220-a may include circuits that provide wireless and/or wired communication with the user device 106 (e.g., communication module 220-b of the user device 106). In some implementations, the communication modules 220-a, 220-b may include wireless communication circuits, such as Bluetooth circuits and/or Wi-Fi circuits. In some implementations, the communication modules 220-a, 220-b can include wired communication circuits, such as Universal Serial Bus (USB) communication circuits. Using the communication module 220-a, the ring 104 and the user device 106 may be configured to communicate with each other. The processing module 230-a of the ring may be configured to transmit/receive data to/from the user device 106 via the communication module 220-a. Example data may include, but is not limited to, motion data, temperature data, pulse waveforms, heart rate data, HRV data, PPG data, and status updates (e.g., charging status, battery charge level, and/or ring 104 configuration settings). The processing module 230-a of the ring may also be configured to receive updates (e.g., software/firmware updates) and data from the user device 106.

The ring 104 may include a battery 210 (e.g., a rechargeable battery 210). An example battery 210 may include a Lithium-Ion or Lithium-Polymer type battery 210, although a variety of battery 210 options are possible. The battery 210 may be wirelessly charged. In some implementations, the ring 104 may include a power source other than the battery 210, such as a capacitor. The power source (e.g., battery 210 or capacitor) may have a curved geometry that matches the curve of the ring 104. In some aspects, a charger or other power source may include additional sensors that may be used to collect data in addition to, or which supplements, data collected by the ring 104 itself. Moreover, a charger or other power source for the ring 104 may function as a user device 106, in which case the charger or other power source for the ring 104 may be configured to receive data from the ring 104, store and/or process data received from the ring 104, and communicate data between the ring 104 and the servers 110.

In some aspects, the ring 104 includes a power module 225 that may control charging of the battery 210. For example, the power module 225 may interface with an external wireless charger that charges the battery 210 when interfaced with the ring 104. The charger may include a datum structure that mates with a ring 104 datum structure to create a specified orientation with the ring 104 during 104 charging. The power module 225 may also regulate voltage(s) of the device electronics, regulate power output to the device electronics, and monitor the state of charge of the battery 210. In some implementations, the battery 210 may include a protection circuit module (PCM) that protects the battery 210 from high current discharge, over voltage during 104 charging, and under voltage during 104 discharge. The power module 225 may also include electro-static discharge (ESD) protection.

The one or more temperature sensors 240 may be electrically coupled to the processing module 230-a. The temperature sensor 240 may be configured to generate a temperature signal (e.g., temperature data) that indicates a temperature read or sensed by the temperature sensor 240. The processing module 230-a may determine a temperature of the user in the location of the temperature sensor 240. For example, in the ring 104, temperature data generated by the temperature sensor 240 may indicate a temperature of a user at the user's finger (e.g., skin temperature). In some implementations, the temperature sensor 240 may contact the user's skin. In other implementations, a portion of the housing 205 (e.g., the inner housing 205-a) may form a barrier (e.g., a thin, thermally conductive barrier) between the temperature sensor 240 and the user's skin. In some implementations, portions of the ring 104 configured to contact the user's finger may have thermally conductive portions and thermally insulative portions. The thermally conductive portions may conduct heat from the user's finger to the temperature sensors 240. The thermally insulative portions may insulate portions of the ring 104 (e.g., the temperature sensor 240) from ambient temperature.

In some implementations, the temperature sensor 240 may generate a digital signal (e.g., temperature data) that the processing module 230-a may use to determine the temperature. As another example, in cases where the temperature sensor 240 includes a passive sensor, the processing module 230-a (or a temperature sensor 240 module) may measure a current/voltage generated by the temperature sensor 240 and determine the temperature based on the measured current/voltage. Example temperature sensors 240 may include a thermistor, such as a negative temperature coefficient (NTC) thermistor, or other types of sensors including resistors, transistors, diodes, and/or other electrical/electronic components.

The processing module 230-a may sample the user's temperature over time. For example, the processing module 230-a may sample the user's temperature according to a sampling rate. An example sampling rate may include one sample per second, although the processing module 230-a may be configured to sample the temperature signal at other sampling rates that are higher or lower than one sample per second. In some implementations, the processing module 230-a may sample the user's temperature continuously throughout the day and night. Sampling at a sufficient rate (e.g., one sample per second) throughout the day may provide sufficient temperature data for analysis described herein.

The processing module 230-a may store the sampled temperature data in memory 215. In some implementations, the processing module 230-a may process the sampled temperature data. For example, the processing module 230-a may determine average temperature values over a period of time. In one example, the processing module 230-a may determine an average temperature value each minute by summing all temperature values collected over the minute and dividing by the number of samples over the minute. In a specific example where the temperature is sampled at one sample per second, the average temperature may be a sum of all sampled temperatures for one minute divided by sixty seconds. The memory 215 may store the average temperature values over time. In some implementations, the memory 215 may store average temperatures (e.g., one per minute) instead of sampled temperatures in order to conserve memory 215.

The sampling rate, that may be stored in memory 215, may be configurable. In some implementations, the sampling rate may be the same throughout the day and night. In other implementations, the sampling rate may be changed throughout the day/night. In some implementations, the ring 104 may filter/reject temperature readings, such as large spikes in temperature that are not indicative of physiological changes (e.g., a temperature spike from a hot shower). In some implementations, the ring 104 may filter/reject temperature readings that may not be reliable due to other factors, such as excessive motion during 104 exercise (e.g., as indicated by a motion sensor 245).

The ring 104 (e.g., communication module) may transmit the sampled and/or average temperature data to the user device 106 for storage and/or further processing. The user device 106 may transfer the sampled and/or average temperature data to the server 110 for storage and/or further processing.

Although the ring 104 is illustrated as including a single temperature sensor 240, the ring 104 may include multiple temperature sensors 240 in one or more locations, such as arranged along the inner housing 205-a near the user's finger. In some implementations, the temperature sensors 240 may be stand-alone temperature sensors 240. Additionally, or alternatively, one or more temperature sensors 240 may be included with other components (e.g., packaged with other components), such as with the accelerometer and/or processor.

The processing module 230-a may acquire and process data from multiple temperature sensors 240 in a similar manner described with respect to a single temperature sensor 240. For example, the processing module 230 may individually sample, average, and store temperature data from each of the multiple temperature sensors 240. In other examples, the processing module 230-a may sample the sensors at different rates and average/store different values for the different sensors. In some implementations, the processing module 230-a may be configured to determine a single temperature based on the average of two or more temperatures determined by two or more temperature sensors 240 in different locations on the finger.

The temperature sensors 240 on the ring 104 may acquire distal temperatures at the user's finger (e.g., any finger). For example, one or more temperature sensors 240 on the ring 104 may acquire a user's temperature from the underside of a finger or at a different location on the finger. In some implementations, the ring 104 may continuously acquire distal temperature (e.g., at a sampling rate). Although distal temperature measured by a ring 104 at the finger is described herein, other devices may measure temperature at the same/different locations. In some cases, the distal temperature measured at a user's finger may differ from the temperature measured at a user's wrist or other external body location. Additionally, the distal temperature measured at a user's finger (e.g., a "shell" temperature) may differ from the user's core temperature. As such, the ring 104 may provide a useful temperature signal that may not be acquired at other internal/external locations of the body. In some cases, continuous temperature measurement at the finger may capture temperature fluctuations (e.g., small or large fluctuations) that may not be evident in core temperature. For example, continuous temperature measurement at the finger may capture minute-to-minute or hour-to-hour temperature fluctuations that provide additional insight that may not be provided by other temperature measurements elsewhere in the body.

The ring 104 may include a PPG system 235. The PPG system 235 may include one or more optical transmitters that transmit light. The PPG system 235 may also include one or more optical receivers that receive light transmitted by the one or more optical transmitters. An optical receiver may generate a signal (hereinafter "PPG" signal) that indicates an amount of light received by the optical receiver. The optical transmitters may illuminate a region of the user's finger. The PPG signal generated by the PPG system 235 may indicate the perfusion of blood in the illuminated region. For example, the PPG signal may indicate blood volume changes in the illuminated region caused by a user's pulse pressure. The processing module 230-a may sample the PPG signal and determine a user's pulse waveform based on the PPG signal. The processing module 230-a may determine a variety of physiological parameters based on the user's pulse waveform, such as a user's respiratory rate, heart rate, HRV, oxygen saturation, and other circulatory parameters.

In some implementations, the PPG system 235 may be configured as a reflective PPG system 235 in which the optical receiver(s) receive transmitted light that is reflected through the region of the user's finger. In some implementations, the PPG system 235 may be configured as a transmissive PPG system 235 in which the optical transmitter(s) and optical receiver(s) are arranged opposite to one another, such that light is transmitted directly through a portion of the user's finger to the optical receiver(s).

The number and ratio of transmitters and receivers included in the PPG system 235 may vary. Example optical transmitters may include LEDs. The optical transmitters may transmit light in the infrared spectrum and/or other spectrums. Example optical receivers may include, but are not limited to, photosensors, phototransistors, and photodiodes. The optical receivers may be configured to generate PPG signals in response to the wavelengths received from the optical transmitters. The location of the transmitters and receivers may vary. Additionally, a single device may include reflective and/or transmissive PPG systems 235.

The PPG system 235 illustrated in FIG. 2 may include a reflective PPG system 235 in some implementations. In these implementations, the PPG system 235 may include a centrally located optical receiver (e.g., at the bottom of the ring 104) and two optical transmitters located on each side of the optical receiver. In this implementation, the PPG system 235 (e.g., optical receiver) may generate the PPG signal based on light received from one or both of the optical transmitters. In other implementations, other placements, combinations, and/or configurations of one or more optical transmitters and/or optical receivers are contemplated.

The processing module 230-*a* may control one or both of the optical transmitters to transmit light while sampling the PPG signal generated by the optical receiver. In some implementations, the processing module 230-*a* may cause the optical transmitter with the stronger received signal to transmit light while sampling the PPG signal generated by the optical receiver. For example, the selected optical transmitter may continuously emit light while the PPG signal is sampled at a sampling rate (e.g., 250 Hz).

Sampling the PPG signal generated by the PPG system 235 may result in a pulse waveform, that may be referred to as a "PPG." The pulse waveform may indicate blood pressure vs time for multiple cardiac cycles. The pulse waveform may include peaks that indicate cardiac cycles. Additionally, the pulse waveform may include respiratory induced variations that may be used to determine respiration rate. The processing module 230-*a* may store the pulse waveform in memory 215 in some implementations. The processing module 230-*a* may process the pulse waveform as it is generated and/or from memory 215 to determine user physiological parameters described herein.

The processing module 230-*a* may determine the user's heart rate based on the pulse waveform. For example, the processing module 230-*a* may determine heart rate (e.g., in beats per minute) based on the time between peaks in the pulse waveform. The time between peaks may be referred to as an interbeat interval (IBI). The processing module 230-*a* may store the determined heart rate values and IBI values in memory 215.

The processing module 230-*a* may determine HRV over time. For example, the processing module 230-*a* may determine HRV based on the variation in the IBIs. The processing module 230-*a* may store the HRV values over time in the memory 215. Moreover, the processing module 230-*a* may determine the user's respiratory rate over time. For example, the processing module 230-*a* may determine respiratory rate based on frequency modulation, amplitude modulation, or baseline modulation of the user's IBI values over a period of time. Respiratory rate may be calculated in breaths per minute or as another breathing rate (e.g., breaths per 30 seconds). The processing module 230-*a* may store user respiratory rate values over time in the memory 215.

The ring 104 may include one or more motion sensors 245, such as one or more accelerometers (e.g., 6-D accelerometers) and/or one or more gyroscopes (gyros). The motion sensors 245 may generate motion signals that indicate motion of the sensors. For example, the ring 104 may include one or more accelerometers that generate acceleration signals that indicate acceleration of the accelerometers. As another example, the ring 104 may include one or more gyro sensors that generate gyro signals that indicate angular motion (e.g., angular velocity) and/or changes in orientation. The motion sensors 245 may be included in one or more sensor packages. An example accelerometer/gyro sensor is a Bosch BMI160 inertial micro electro-mechanical system (MEMS) sensor that may measure angular rates and accelerations in three perpendicular axes.

The processing module 230-*a* may sample the motion signals at a sampling rate (e.g., 50 Hz) and determine the motion of the ring 104 based on the sampled motion signals. For example, the processing module 230-*a* may sample acceleration signals to determine acceleration of the ring 104. As another example, the processing module 230-*a* may sample a gyro signal to determine angular motion. In some implementations, the processing module 230-*a* may store motion data in memory 215. Motion data may include sampled motion data as well as motion data that is calculated based on the sampled motion signals (e.g., acceleration and angular values).

The ring 104 may store a variety of data described herein. For example, the ring 104 may store temperature data, such as raw sampled temperature data and calculated temperature data (e.g., average temperatures). As another example, the ring 104 may store PPG signal data, such as pulse waveforms and data calculated based on the pulse waveforms (e.g., heart rate values, IBI values, HRV values, and respiratory rate values). The ring 104 may also store motion data, such as sampled motion data that indicates linear and angular motion.

The ring 104, or other computing device, may calculate and store additional values based on the sampled/calculated physiological data. For example, the processing module 230 may calculate and store various metrics, such as sleep metrics (e.g., a Sleep Score), activity metrics, and readiness metrics. In some implementations, additional values/metrics may be referred to as "derived values." The ring 104, or other computing/wearable device, may calculate a variety of values/metrics with respect to motion. Example derived values for motion data may include, but are not limited to, motion count values, regularity values, intensity values, metabolic equivalence of task values (METs), and orientation values. Motion counts, regularity values, intensity values, and METs may indicate an amount of user motion (e.g., velocity/acceleration) over time. Orientation values may indicate how the ring 104 is oriented on the user's finger and if the ring 104 is worn on the left hand or right hand.

In some implementations, motion counts and regularity values may be determined by counting a number of acceleration peaks within one or more periods of time (e.g., one or more 30 second to 1 minute periods). Intensity values may indicate a number of movements and the associated intensity (e.g., acceleration values) of the movements. The intensity values may be categorized as low, medium, and high, depending on associated threshold acceleration values. METs may be determined based on the intensity of movements during a period of time (e.g., 30 seconds), the regularity/irregularity of the movements, and the number of movements associated with the different intensities.

In some implementations, the processing module 230-*a* may compress the data stored in memory 215. For example, the processing module 230-*a* may delete sampled data after making calculations based on the sampled data. As another example, the processing module 230-*a* may average data over longer periods of time in order to reduce the number of stored values. In a specific example, if average temperatures for a user over one minute are stored in memory 215, the processing module 230-*a* may calculate average temperatures over a five minute time period for storage, and then subsequently erase the one minute average temperature data. The processing module 230-*a* may compress data based on a variety of factors, such as the total amount of used/available memory 215 and/or an elapsed time since the ring 104 last transmitted the data to the user device 106.

Although a user's physiological parameters may be measured by sensors included on a ring 104, other devices may measure a user's physiological parameters. For example, although a user's temperature may be measured by a temperature sensor 240 included in a ring 104, other devices may measure a user's temperature. In some examples, other wearable devices (e.g., wrist devices) may include sensors that measure user physiological parameters. Additionally, medical devices, such as external medical devices (e.g., wearable medical devices) and/or implantable medical devices, may measure a user's physiological parameters. One or more sensors on any type of computing device may be used to implement the techniques described herein.

The physiological measurements may be taken continuously throughout the day and/or night. In some implementations, the physiological measurements may be taken during 104 portions of the day and/or portions of the night. In some implementations, the physiological measurements may be taken in response to determining that the user is in a specific state, such as an active state, resting state, and/or a sleeping state. For example, the ring 104 can make physiological measurements in a resting/sleep state in order to acquire cleaner physiological signals. In one example, the ring 104 or other device/system may detect when a user is resting and/or sleeping and acquire physiological parameters (e.g., temperature) for that detected state. The devices/systems may use the resting/sleep physiological data and/or other data when the user is in other states in order to implement the techniques of the present disclosure.

In some implementations, as described previously herein, the ring 104 may be configured to collect, store, and/or process data, and may transfer any of the data described herein to the user device 106 for storage and/or processing. In some aspects, the user device 106 includes a wearable application 250, an operating system (OS), a web browser application (e.g., web browser 280), one or more additional applications, and a GUI 275. The user device 106 may further include other modules and components, including sensors, audio devices, haptic feedback devices, and the like. The wearable application 250 may include an example of an application (e.g., "app") that may be installed on the user device 106. The wearable application 250 may be configured to acquire data from the ring 104, store the acquired data, and process the acquired data as described herein. For example, the wearable application 250 may include a user interface (UI) module 255, an acquisition module 260, a processing module 230-*b*, a communication module 220-*b*, and a storage module (e.g., database 265) configured to store application data.

The various data processing operations described herein may be performed by the ring 104, the user device 106, the servers 110, or any combination thereof. For example, in some cases, data collected by the ring 104 may be pre-processed and transmitted to the user device 106. In this example, the user device 106 may perform some data processing operations on the received data, may transmit the data to the servers 110 for data processing, or both. For instance, in some cases, the user device 106 may perform processing operations that require relatively low processing power and/or operations that require a relatively low latency, whereas the user device 106 may transmit the data to the servers 110 for processing operations that require relatively high processing power and/or operations that may allow relatively higher latency.

In some aspects, the ring 104, user device 106, and server 110 of the system 200 may be configured to evaluate sleep patterns for a user. In particular, the respective components of the system 200 may be used to collect data from a user via the ring 104, and generate one or more scores (e.g., Sleep Score, Readiness Score) for the user based on the collected data. For example, as noted previously herein, the ring 104 of the system 200 may be worn by a user to collect data from the user, including temperature, heart rate, HRV, and the like. Data collected by the ring 104 may be used to determine when the user is asleep in order to evaluate the user's sleep for a given "sleep day." In some aspects, scores may be calculated for the user for each respective sleep day, such that a first sleep day is associated with a first set of scores, and a second sleep day is associated with a second set of scores. Scores may be calculated for each respective sleep day based on data collected by the ring 104 during the respective sleep day. Scores may include, but are not limited to, Sleep Scores, Readiness Scores, and the like.

In some cases, "sleep days" may align with the traditional calendar days, such that a given sleep day runs from midnight to midnight of the respective calendar day. In other cases, sleep days may be offset relative to calendar days. For example, sleep days may run from 6:00 pm (18:00) of a calendar day until 6:00 pm (18:00) of the subsequent calendar day. In this example, 6:00 pm may serve as a "cut-off time," where data collected from the user before 6:00 pm is counted for the current sleep day, and data collected from the user after 6:00 pm is counted for the subsequent sleep day. Due to the fact that most individuals sleep the most at night, offsetting sleep days relative to calendar days may enable the system 200 to evaluate sleep patterns for users in such a manner that is consistent with their sleep schedules. In some cases, users may be able to selectively adjust (e.g., via the GUI) a timing of sleep days relative to calendar days so that the sleep days are aligned with the duration of time that the respective users typically sleep.

In some implementations, each overall score for a user for each respective day (e.g., Sleep Score, Readiness Score) may be determined/calculated based on one or more "contributors," "factors," or "contributing factors." For example, a user's overall Sleep Score may be calculated based on a set of contributors, including: total sleep, efficiency, restfulness, REM sleep, deep sleep, latency, timing, or any combination thereof. The Sleep Score may include any quantity of contributors. The "total sleep" contributor may refer to the sum of all sleep periods of the sleep day. The "efficiency" contributor may reflect the percentage of time spent asleep compared to time spent awake while in bed, and may be calculated using the efficiency average of long sleep periods (e.g., primary sleep period) of the sleep day, weighted by a duration of each sleep period. The "restfulness" contributor may indicate how restful the user's sleep is, and may be calculated using the average of all sleep periods of the sleep day, weighted by a duration of each period. The restfulness contributor may be based on a "wake up count" (e.g., sum of all the wake-ups (when user wakes up) detected during different sleep periods), excessive movement, and a "got up count" (e.g., sum of all the got-ups (when user gets out of bed) detected during the different sleep periods).

The "REM sleep" contributor may refer to a sum total of REM sleep durations across all sleep periods of the sleep day including REM sleep. Similarly, the "deep sleep" contributor may refer to a sum total of deep sleep durations across all sleep periods of the sleep day including deep sleep. The "latency" contributor may signify how long (e.g., average, median, longest) the user takes to go to sleep, and may be calculated using the average of long sleep periods throughout the sleep day, weighted by a duration of each period and the number of such periods (e.g., consolidation of a given sleep stage or sleep stages may be its own contributor or weight other contributors). Lastly, the "timing" contributor may refer to a relative timing of sleep periods within the sleep day and/or calendar day, and may be calculated using the average of all sleep periods of the sleep day, weighted by a duration of each period.

By way of another example, a user's overall Readiness Score may be calculated based on a set of contributors, including: sleep, sleep balance, heart rate, HRV balance, recovery index, temperature, activity, activity balance, or any combination thereof. The Readiness Score may include any quantity of contributors. The "sleep" contributor may refer to the combined Sleep Score of all sleep periods within the sleep day. The "sleep balance" contributor may refer to a cumulative duration of all sleep periods within the sleep day. In particular, sleep balance may indicate to a user whether the sleep that the user has been getting over some duration of time (e.g., the past two weeks) is in balance with the user's needs. Typically, adults need 7-9 hours of sleep a night to stay healthy, alert, and to perform at their best both mentally and physically. However, it is normal to have an occasional night of bad sleep, so the sleep balance contributor takes into account long-term sleep patterns to determine whether each user's sleep needs are being met. The "resting heart rate" contributor may indicate a lowest heart rate from the longest sleep period of the sleep day (e.g., primary sleep period) and/or the lowest heart rate from naps occurring after the primary sleep period.

Continuing with reference to the "contributors" (e.g., factors, contributing factors) of the Readiness Score, the "HRV balance" contributor may indicate a highest HRV average from the primary sleep period and the naps happening after the primary sleep period. The HRV balance contributor may help users keep track of their recovery status by comparing their HRV trend over a first time period (e.g., two weeks) to an average HRV over some second, longer time period (e.g., three months). The "recovery index" contributor may be calculated based on the longest sleep period. Recovery index measures how long it takes for a user's resting heart rate to stabilize during the night. A sign of a very good recovery is that the user's resting heart rate stabilizes during the first half of the night, at least six hours before the user wakes up, leaving the body time to recover for the next day. The "body temperature" contributor may be calculated based on the longest sleep period (e.g., primary sleep period) or based on a nap happening after the longest sleep period if the user's highest temperature during the nap is at least 0.5° C. higher than the highest temperature during the longest period. In some aspects, the ring may measure a user's body temperature while the user is asleep, and the system 200 may display the user's average temperature relative to the user's baseline temperature. If a user's body temperature is outside of their normal range (e.g., clearly above or below 0.0), the body temperature contributor may be highlighted (e.g., go to a "Pay attention" state) or otherwise generate an alert for the user.

In some aspects, the system 200 may support techniques for predicting menstrual cycle onset. In particular, the respective components of the system 200 may be used to estimate a future menstrual cycle onset day based on applying a duration (e.g., that is calculated from previous cycles) to a most recent feature of a trigonometric or polynomial function representing the user's temperature over time. The first day of a menstrual cycle (e.g., menstruation) for the user may be predicted by leveraging temperature sensors on the ring of the system 200. In some cases, the first day of a menstrual cycle may be estimated by fitting the received temperature data to a function or model such as a trigonometric or polynomial function including a plurality of features (e.g., local maximum values, local minimum values, axis crossing locations, location of steepest rate of change, etc.) and calculating a duration between the plurality of features and a corresponding plurality of menstrual cycle onset days.

For example, as noted previously herein, the ring 104 of the system 200 may be worn by a user to collect data from the user, including temperature, heart rate, and the like. The ring of the system 200 may collect the physiological data from the user based on arterial blood flow. The physiological data may be collected continuously. In some implementations, the processing module 230-a may sample the user's temperature continuously throughout the day and night. Sampling at a sufficient rate (e.g., one sample per minute) throughout the day may provide sufficient temperature data for analysis described herein. In some implementations, the ring 104 may continuously acquire temperature data 305 (e.g., at a sampling rate).

Temperature data 305 may provide additional insight to determine the user's menstrual cycle onset. For example, the user may experience an increase in body temperature mid-cycle during ovulation, and the body temperature may be maintained at an increased level during the luteal phase of the cycle (e.g., prior to a first day of a menstrual cycle). In such cases, the temperature data 305 may be used to determine when the user experiences different phases of the menstrual cycle. In some implementations, continuous temperature measurement at the finger may capture minute-to-minute or hour-to-hour temperature fluctuations that provide additional insight that may not be provided by other temperature measurements elsewhere in the body or if the user were manually taking their temperature once per day. Data collected by the ring 104 may be used to determine when the user experiences a first day of menstruation, a first day of ovulation, or any day throughout menstruation, ovulation, and the uterine cycle. Predicted menstrual cycle onsets may be further shown and described with reference to FIG. 3.

Figure 3:
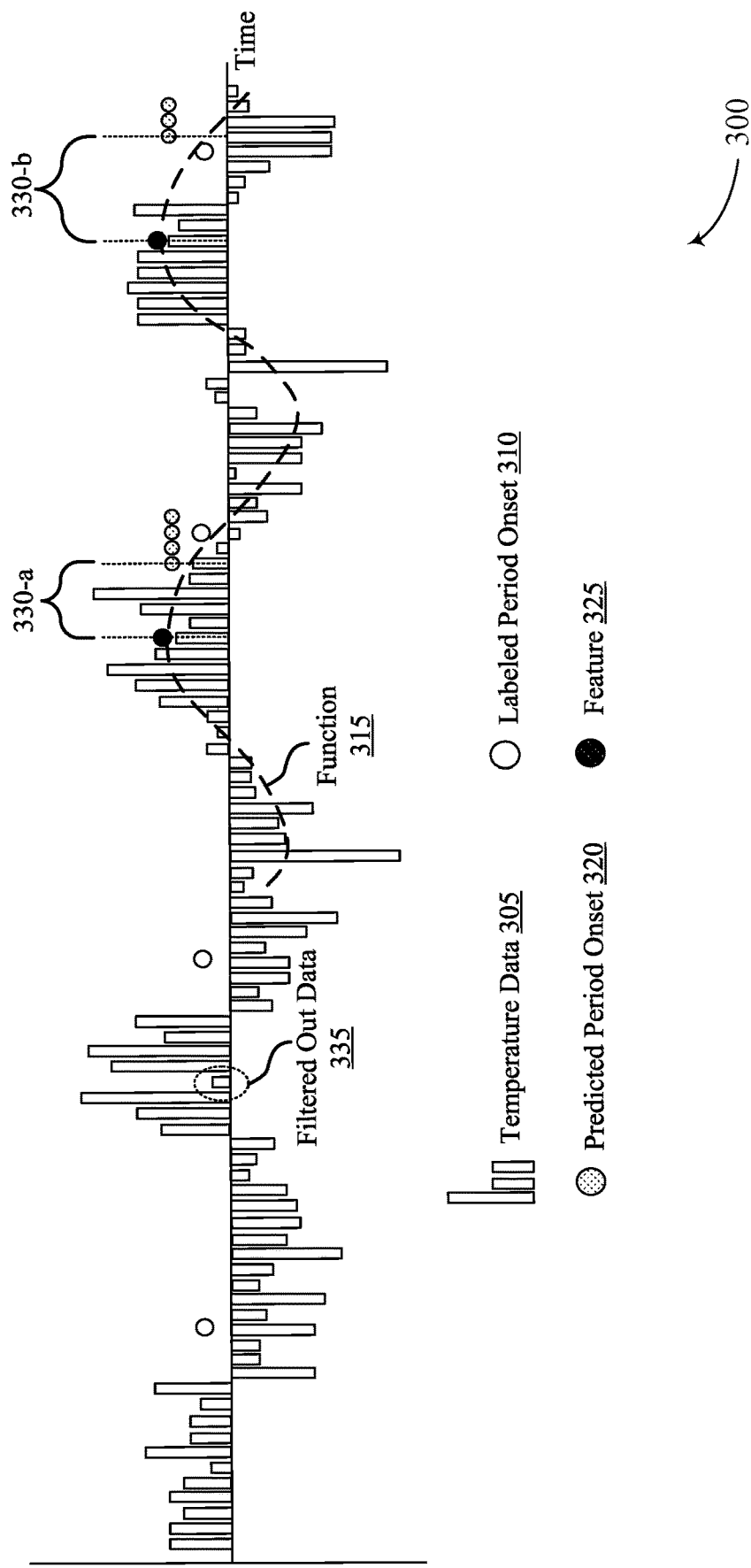
FIG. 3 illustrates an example of a timing diagram that supports techniques for predicting menstrual cycle onset in accordance with aspects of the present disclosure.

FIG. 3 illustrates an example of a timing diagram 300 that supports techniques for predicting menstrual cycle onset in accordance with aspects of the present disclosure. The timing diagram 300 may implement, or be implemented by, aspects of the system 100, system 200, or both. For example, in some implementations, the timing diagram 300 indicating a relative timing of period onset may be displayed to a user 102 via the GUI 275 of the user device 106, as shown in FIG. 2.

As will be described in further detail herein, the system 200 may be configured to detect a menstrual cycle onset (e.g., first day of a period) for a user based on the user's temperature data 305. As such, the timing diagram 300 illustrates a relationship between a user's temperature data 305 and predicted period onset 320. In this regard, the vertical "bars" illustrated in the timing diagram 300 may be understood to refer to a user's measured temperature (e.g., absolute temperature data), temperature deviation (e.g., relative temperature data), or both. In this regard, the vertical bars illustrated in the timing diagram 300 may be referred to as "temperature data 305." In some cases, the system 200 may determine, or estimate, temperature data 305, temperature deviation, or both for a user based on temperature data 305 for the user collected via the ring 104.

The timing diagram 300 shown in FIG. 3 illustrates a relative timing of predicted period onsets 320 relative to traditional calendar days. In particular, the timing diagram 300 illustrates predicted period onsets 320 (e.g., a day that the user experiences a first day of a menstrual cycle) for a user throughout one or more calendar months or a portion of one calendar month. A predicted period onset 320 may be defined as a duration of time that the user experiences a start of a menstrual cycle. For example, a user may experience a predicted period onset 320 on a first day of a menstrual cycle.

The timing diagram 300 may illustrate predicted period onsets 320 throughout a calendar month, where the calendar month may or may not be aligned with traditional calendar months. In some cases, the timing diagram 300 may illustrate predicted period onsets 320 during a month that aligns with the traditional calendar months, such that the illustrated months run from a first calendar day to a last calendar day of the respective calendar month. In other cases, the timing diagram 300 may illustrate predicted period onsets 320 during a calendar month that is offset relative to calendar months (e.g., represent a portion of a calendar month). For example, the timing diagram 300 may illustrate predicted period onsets 320 throughout a calendar month that runs from a first calendar day to a second, subsequent calendar day. In some cases, users may be able to selectively adjust (e.g., via the GUI) a timing of a calendar day (e.g., adjust a relative timing of the timing diagram 300) relative to a calendar month so that the predicted period onsets 320 are aligned with the duration of time that the respective users typically experience a first day of a menstrual cycle.

The timing diagram 300 may illustrate a time interval including 1-day temperature deviation over a 96-day period. The ring 104 of the system 200 may sample the user's skin temperature (e.g., temperature data 305) every five minutes and store the measurements as 1-day averages. The temperature deviation may then be calculated using the 1-day average and the average temperature (e.g., baseline temperature) of the user. The timing diagram 300 may include 7 predicted period onsets 320 and, as described below in further detail. The timing diagram 300 may also include 4 labeled period onsets 310, as described below in further detail.

In some cases, the system 200 (e.g., ring 104, user device 106, server 110) may receive physiological data associated with the user from a wearable device 104. The physiological data may include at least temperature data 305 and also include heart rate data along with other physiological measurements or derived values. The temperature data 305 may be continuously collected by the wearable device. The physiological measurements may be taken continuously throughout the day and/or night. For example, in some implementations, the ring 104 may be configured to acquire physiological data (e.g., temperature data 305, heart rate, and the like) continuously in accordance to one or more measurement periodicities throughout the entirety of each day/sleep day. In other words, the ring 104 may continuously acquire physiological data from the user without regard to "trigger conditions" for performing such measurements. In some cases, continuous temperature measurement at the finger may capture temperature fluctuations (e.g., small or large fluctuations) that may not be evident in core temperature. For example, continuous temperature measurement at the finger may capture minute-to-minute or hour-to-hour temperature fluctuations that provide additional insight that may not be provided by other temperature measurements elsewhere in the body or if the user were manually taking their temperature once per day.

The system 200 may fit the received temperature data 305 to a function 315 that includes a plurality of features 325. The function 315 may be an example of a trigonometric function (e.g., sinusoidal function, cosine function, or tangent function) or a polynomial function (e.g., second degree or third degree), or any other mathematical model capable of representing the temperature fluctuation pattern of the measured temperature data 305. In the example illustrated in timing diagram 300, the function 315 is a sinusoidal function.

A feature of the function 315 may be a local maximum value, a local minimum value, a slope of the function 315, or an x-intercept of the function 315. In the example of the timing diagram 300, the plurality of features 325 are local maximum values of the function 315. The system 200 may determine the maximum value (e.g., feature 325) of the function 315 based on the characteristics of the sinusoidal function. In some cases, the calendar month may include a single maximum value such that the system 200 may identify the maximum value.

The system 200 may calculate a duration 330 between the feature 325 and a corresponding predicted period onset 320. The system 200 may estimate a predicted period onset 320 (e.g., a future menstrual cycle onset day) that the user experiences a first day of a menstrual cycle based on applying the duration 330 to a most recent local maximum value (e.g., feature 325) of the sinusoidal function (e.g., function 315). In such cases, the system 200 may cause a GUI of a user device to display an indication of the predicted period onset 320.

For example, the system 200 may calculate a duration 330-a to be 4 calendar days between the feature 325 and a first day of the predicted period onset 320. In such cases, the system 200 may estimate 4 days for the predicted period onset 320. In other examples, the system 200 may calculate a duration 330-b to be 6 calendar days between feature 325 and a first day of the predicted period onset 320. In such cases, the system 200 may estimate 6 days for the predicted period onset 320.

The duration 330 may be an example of an average value. For example, the system 200 may use a plurality of labeled period onsets 310 to determine the duration 330. In such cases, the system 200 may average a plurality of durations 330 (e.g., past instances of the duration 330) based on the plurality of labeled period onsets 310. In other examples, the duration 330 may be an example of an adaptive value. For example, the duration 330 may be calculated based on a weighted average of past instances of the duration 330. In one example, the system 200 may use a plurality of labeled period onsets 310 to determine the duration 330 for the previous periods may be 5 days, 3 days, 3 days, and 3 days. In such cases, the system 200 may determine that the duration 330 may be 3 days based on calculated a weighted average of the past instances of the duration. In some cases, the system 200 may omit exceptional durations 330 from the average or weighted average. For example, the system 200 may calculate the duration 330 with exceptional durations 330 (e.g., because of sickness, alcohol, traveling, etc.) omitted from the duration 330 calculation.

In some cases, the system 200 may fit the received temperature data 305 to two different functions 315. For example, the first function 315 may include temperature data 305 received for a first time interval (e.g., 20 calendar days), and the second function 315 may include temperature data 305 received for a second time interval (e.g., 60 calendar days). In such cases, the first time interval may be less than the second time interval. The system 200 may fit the received temperature data 305 to the first function 315 where the first function 315 may include a first quantity of a first plurality of features 325 (e.g., local maximum values). The system 200 may fit the received temperature data 305 to a second function 315 where the second function 315 may include a second quantity of a second plurality of features 325 (e.g., local maximum values). Because the two functions are fit to two different durations of collected data, they may capture different nuances in the temperature fluctuation pattern. For example, the function fit to the longer time interval may more accurately capture long-term trends for the user (e.g., the duration between maximum temperature and period onset for several cycles), whereas the function fit to the shorter time interval may capture more recent physiological trends for the user based on factors occurring within the shorter duration (e.g., changes in exercise patterns, illness, etc.).

The system 200 may select between the two functions to more accurately estimate the predicted period onset 320. For example, the system 200 may select the second function 315 based on fitting the received temperature data 305 to the first function 315 and the second function 315. In such cases, a time interval that spans a greater amount of calendar days may result in a predicted period onset 320 that is more accurate than a time interval that spans a fewer amount of calendar days. Calculating the duration between the plurality of features 325 and the corresponding plurality of menstrual cycle onset days may be based on selecting the second function 315. The system 200 may estimate the accuracy of the prediction based on the two separate functions 315 (e.g., sinusoidal wave fitting) for different lengths of historical data (e.g., 60 calendar days and 20 calendar days).

In some cases, the system 200 may receive, via the user device 106, an indication of the corresponding plurality of menstrual cycle onset days (e.g. labeled period onset 310). In such cases, the system 200 may estimate the future menstrual cycle onset day (e.g., predicted period onset 320) based on receiving the indication. For example, the system 200 may receive an indication of previous period onset days (e.g., labeled period onset 310) that may be tagged (e.g., input) by the user. The system 200 may use the labeled period onsets 310 to determine the duration 330. That is, the system 200 may compare various features of the function 315 (e.g., local maximum values, local minimum values, etc.) to the previous user-labeled period onsets 310 to derive relationships between the function 315 and the user's period onset 310. In the example shown in FIG. 3, the system 200 may determine the duration 330 from a local maximum temperature (e.g., feature 325) to the subsequent period onset 310 for several previous menstrual cycles. For example, the user may input labeled period onsets 310 for the first two months (e.g., 60 days) in order to estimate the predicted period onset 320 for the upcoming menstrual cycle. After the labeled period onsets 310 have been input for the first two months, the function 315 and received temperature data 305 may calculate the duration 330 and estimate the predicted period onset 320.

In such cases, the system 200 may utilize the "calendar method" when the temperature data 305 is unavailable. Receiving an indication of the corresponding plurality of menstrual cycle onset days may be particularly beneficial when estimating predicted period onset 320 for new users (e.g., users who recently started wearing a ring 104), as the system 200 may not have sufficient data to determine the user's own menstrual cycle. In other examples, the system 200 may receive an indication of the corresponding plurality of menstrual cycle onset days (e.g. labeled period onset 310) after the prediction model starts. For example, the system 200 may estimate the predicted period onset 320, the user may experience a first day of the menstrual cycle (e.g., period), and the system 200 may receive an indication of the first day of the menstrual cycle (e.g., labeled period onset 310) to confirm the predicted period onset 320.

The system 200 may identify a next feature 325 of the function 315. For example, the system 200 may identify a maximum of the function 315 and based on calculating the duration 330, the system 200 may identify the predicted period onset 320 using the duration 330 and the feature 325-a. The system 200 may identify the maximum based on location of the feature 325 relative to the predicted period onset 320. For example, the duration 330 from the feature 325 to the predicted period onset 320 may be shorter than a duration from the predicted period onset 320 to a minimum value of the function 315. In some examples, the predicted period onset 320 may occur 6 days after the feature 325 (e.g., maximum value) of the function 315. In some cases, the duration 330 from feature 325 to predicted period onset 320 may be personalized and adjusted for the user. For example, the duration 330 may be 4-5 days from the feature 325 to the predicted period onset 320. The system 200 may refrain from using the x-intercept of the function 315 to estimate the predicted period onset 320 because, in some cases, all the temperature data 305 may be above the baseline. In other examples, the system 200 may identify the maximum based on the stability of the luteal phase (e.g., high temperature phase), that may be further shown and described with reference to FIG. 4.

In some examples, the system 200 may identify a baseline temperature associated with the user based on receiving the physiological data. The baseline temperature may include a nighttime temperature baseline. In other examples, the system 200 may identify a nighttime temperature baseline for a group of users and identify the baseline temperature associated with the user based on identifying the nighttime temperature baseline. In such cases, the system 200 may determine a nighttime baseline temperature based on average nighttime baseline temperature of a group of people. Determining a baseline temperature for a group of users may be particularly beneficial when predicting period onset 320 for new users (e.g., users who recently started wearing a ring 104), as the system 200 may not have sufficient data to determine the user's own personal baseline temperature. The baseline temperature may be, for example, 35-36.5° C., that may be within a range of the actual core body temperature of the user. The baseline temperature may be used to determine a temperature deviation from the baseline temperature. In some cases, the baseline temperature may be used on a 30-day average of nighttime temperatures.

The system 200 may determine a nighttime baseline temperature based on acquired physiological data and may determine the temperature deviation. The system 200 may determine that a temperature deviation from the baseline temperature satisfies a threshold during at least a portion of a time interval. In such cases, the system 200 may filter out the received temperature data 305 (e.g., filtered-out data 335) during at least the portion of the time interval based on determining that the temperature deviation satisfies the threshold. The system 200 may then fit the received temperature data 305 to the function 315 based on the filtered-out data 335. The system 200 may use the temperature deviation to filter out the temperature data 305 if the temperature deviation is too high (e.g., above a configured threshold). In such cases, the system 200 may refrain from using temperature data 305 on those days for the prediction, thereby pre-processing/filtering the temperature data 305. The system 200 may pre-process the temperature data 305 to determine the filtered-out data 335, thereby improving the accuracy of the prediction. The temperature deviation may be based on a second highest half-hour from the night that omits the highest half-hour from the calculation due to increased uncertainty and reliability.

In some cases, the system 200 may estimate the predicted period onset 320 based on temperature data 305 from the last 60 days (e.g., two months). In such cases, the system 200 may identify the heart rate average of the user from the latest (e.g., previous) night. The system 200 may receive physiological data including heart rate data. The system 200 may identify a heart rate threshold associated with the user based on receiving the physiological data. In such cases, the system 200 may determine that the received heart rate data satisfies a threshold for at least a portion of a time interval. The system 200 may be configured to filter out the received temperature data 305 (e.g., filtered-out data 335) during at least the portion of the time interval based on determining that the received heart rate data satisfies the threshold. In some cases, fitting the received temperature data 305 to the sinusoidal function may be based on filtering out the received temperature data 305. In such cases, the system 200 uses heart rate data to filter out the temperature data 305 if the heart rate is too high and refrains from using temperature data 305 on those days for the prediction. For example, the system 200 may avoid taking into account exercise data that may skew the temperature data 305 associated with determining the predicted period onset 320. The system 200 may pre-process or filter the temperature data 305. In such cases, the system 200 may use the heart rate data to determine the filtered-out data 335, thereby improving the accuracy of the prediction.

In some cases, the temperature data 305 may include missing data in which the temperature data 305 may be unavailable for a calendar day or an amount of calendar days. In such cases, the system 200 may fill in the missing data (e.g., temperature data 305) with the previous days' temperature data 305. For example the system 200 may fill in 2 calendar days for missing data. In some cases, the system 200 may calculate rolling 5-day median values for each day.

The system 200 may be configured to determine "baseline physiological data" (e.g., baseline temperature data, heart rate threshold) according to the user's own biological rhythms (e.g., circadian rhythms, ultradian rhythms, seasonal rhythms), and may be configured to compare collected temperature data 305 and/or heart rate data to the determined baseline data. In other words, the user's baseline physiological data (e.g., baseline temperature, heart rate threshold) may be dynamic based on the user's own biological rhythms. Moreover, thresholds against which collected temperature data and/or heart rate data is compared may be based on the user's dynamic baseline data/thresholds. In other words, the system 200 may be configured to compensate for natural changes in a user's physiological parameters that are attributable to the user's natural circadian rhythm (and/or other rhythms). The heart rate threshold may be based on a nighttime average heart rate.

In some implementations, the system 200 may utilize classifiers (e.g., machine learning classifiers) to identify predicted period onset 320. In particular, the system 200 may train a classifier to identify predicted period onset 320 for a user based on inputted physiological data for the user. For example, in some cases, physiological data collected from a user (e.g., including the temperature data 305 and/or heart rate data) may be inputted into a classifier (e.g., machine learning classifier), where identifying predicted period onsets 320 is based on inputting the physiological data into the machine learning classifier (e.g., the classifier is configured to identify predicted period onsets 320).

In some implementations, user inputs received from a user (e.g., via GUI of the user device 106) may be used to further train a classifier to identify predicted period onsets 320. In other words, a user may be able to generate user inputs that may then be used to train the machine learning classifier. For example, the classifier may identify/predict a period onset 320 for a user based on received physiological data. Subsequently, the system 200 may prompt the user (e.g., via the GUI) to confirm or deny whether the user experienced a predicted period onset 320, and the user inputs (e.g., confirmation or denial of a predicted period onset 320) may be used to further train the classifier to become more effective at accurately identifying predicted period onsets 320.

The user may experience irregular menstrual cycles based on a quantity of factors including stress, illness, increased physical activity, and the like. In some cases, the system 200 may adjust the estimation for predicted period onsets 320 based on user input (e.g., including the factors that may affect the regularity of the menstrual cycle). In other examples, if the system 200 includes 60 days of temperature data 305 and menstrual cycle history (e.g., including labeled period onsets 310), the system 200 may be able to automatically account for the factors that influence the regularity of the menstrual cycle.

A predicted period onset 320 may be estimated based on personalized reference values and physiological data for each individual user. In other words, thresholds and reference values used to determine predicted period onsets 320 may be individualized for each respective user. For example, the system 200 may use a nighttime temperature deviation that may be an example of a recursive average of the last thirty nights with exceptional nights (e.g., because of sickness, alcohol, traveling, etc.) omitted from the average. The system 200 may also use the daytime continuous skin temperature (e.g., temperature data 305), daytime continuous heart rate data, a population-based average difference between nighttime and daytime temperatures, a cutoff point for daytime temperature, and a cutoff point for daytime heart rate.

The system 200 may be configured to detect multiple predicted period onsets 320 within a calendar month. Moreover, the system 200 may be configured to adjust Readiness Scores based on predicted period onsets 320 detected throughout the month. In addition to supporting a diverse group of users, being able to detect predicted period onsets 320 may provide more accurate health information to the users, and may improve business-to-business (B2B) use cases, such as illness detection and fertility initiatives. Moreover, as noted previously herein, the detection of "predicted period onset" for a user may enable the system 200 to determine a more complete and accurate picture of the user's overall health (e.g., more accurate Readiness Scores). As such, by enabling more complete and accurate Readiness Scores, techniques described herein may enable the system 200 to provide improved insights and guidance to the user that better correlate to the user's overall health.

For the purposes of the present disclosure, the terms "period onset," "period onset day," "menstrual cycle onset," "menstrual cycle onset day," "period," "menstruation," and like terms, may be used interchangeably. In some cases, the system 200 (e.g., user device 106, server 110) may be configured to receive data collected from a user via the ring 104, and predict a first day of a menstrual cycle.

Referring to the system 200 illustrated in FIG. 2, the ring 104 may be worn by a user and may collect data associated with the user throughout a calendar day (e.g., 24 hour period). The ring 104 may collect data (e.g., temperature, heart rate) and transmit collected data to the user device 106. In some cases, the user device 106 may forward (e.g., relay, transmit) the data received from the ring 104 to the servers for processing. Additionally, or alternatively, the user device 106 and/or the ring 104 may perform processing on the collected data.

Continuing with the same example, the ring 104, the user device 106, the servers 110, or any combination thereof, may estimate a future menstrual cycle onset day (e.g., predicted period onset 320) based on the collected data. Upon estimating a predicted period onset 320, the servers 110 may transmit an indication of the predicted period onset 320 to the user device 106. Alternatively, in cases where the user device 106 performs data processing, the user device 106 may generate the indication of the predicted period onset 320. In this example, the next time the user opens the wearable application 250, an indication of the predicted period onset 320 may be presented to the user via the GUI of the user device 106. This may be further understood with reference to FIG. 5.

Figure 4:
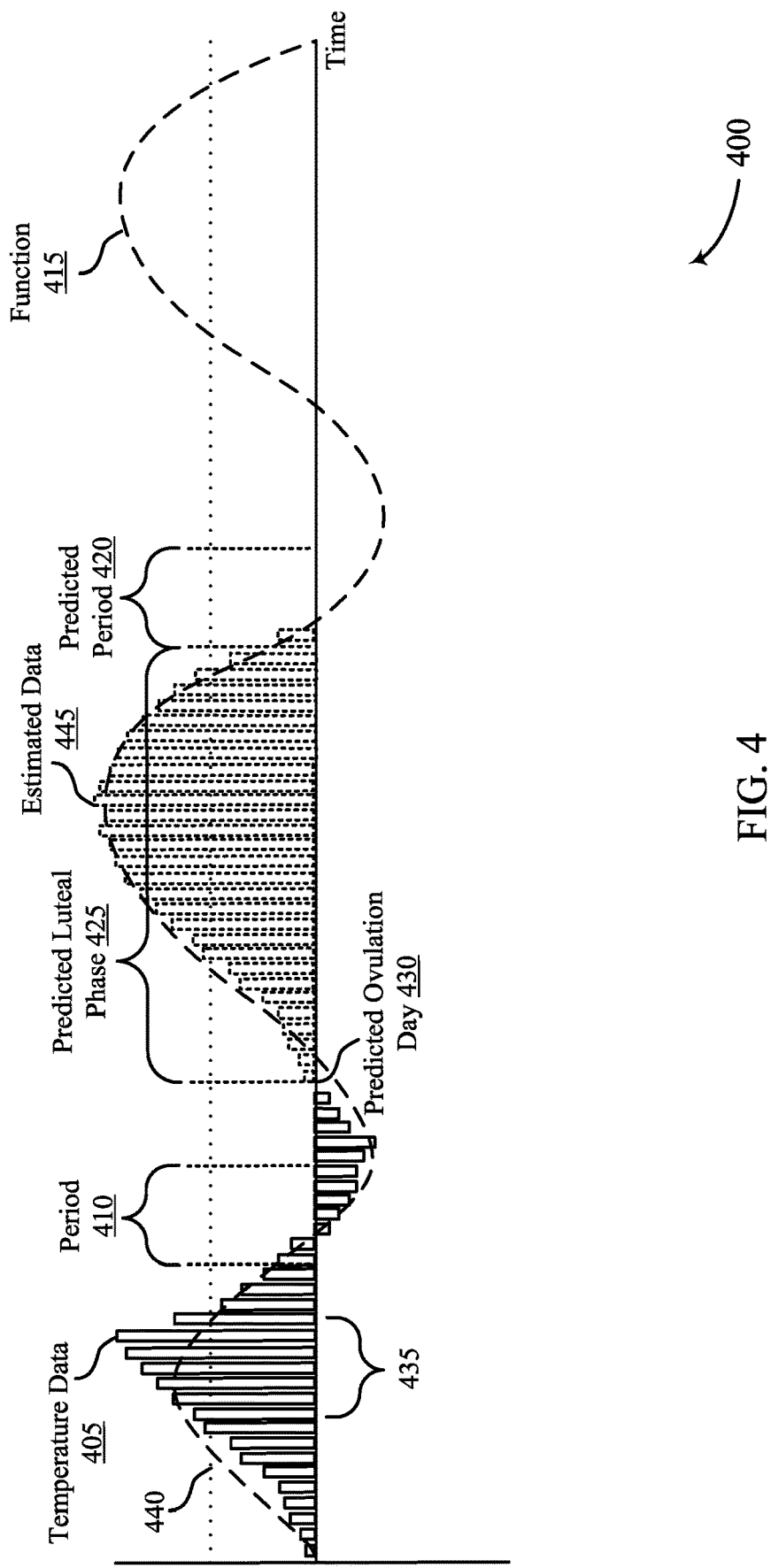
FIG. 4 illustrates an example of a timing diagram that supports techniques for predicting menstrual cycle onset in accordance with aspects of the present disclosure.

FIG. 4 illustrates an example of a timing diagram 400 that supports techniques for predicting menstrual cycle onset in accordance with aspects of the present disclosure. The timing diagram 400 may implement, or be implemented by, aspects of the system 100, system 200, or both. For example, in some implementations, the timing diagram 400 indicating a relative timing of a luteal phase and ovulation day may be displayed to a user 102 via the GUI 275 of the user device 106, as shown in FIG. 2

As will be described in further detail herein, the system 200 may be configured to detect a luteal phase and ovulation day of a menstrual cycle for a user based on the user's temperature data 405. For example, the timing diagram 400 illustrates a relationship between a user's temperature data 405, estimated data 445, predicted luteal phase 425, and the predicted ovulation day 430. In this regard, the vertical "bars" illustrated in the timing diagram 400 may be understood to refer to a user's temperature (e.g., temperature data 405), temperature deviation, or both. In some cases, the system 200 may determine, or estimate, temperature data 405, temperature deviation, or both for a user based on temperature data 405 for the user collected via the ring 104.

The timing diagram 400 shown in FIG. 4 illustrates a relative timing of predicted luteal phase 425 and predicted ovulation day 430 relative to traditional calendar days. In particular, the timing diagram 400 illustrates the predicted luteal phase 425 and predicted ovulation day 430 for a user throughout one or more calendar months or a portion of one calendar month.

The system 200 may fit the received temperature data 405 to a function 415. The function 415 may be an example of a trigonometric function (e.g., sinusoidal function, cosine function, or tangent function) or a polynomial function (e.g., second degree or third degree). In the example illustrated in timing diagram 400, the function 415 is an example of a sinusoidal function. The function 415 may include an amplitude and frequency. The function 415 may further include angles and a slope associated with the maximum values (e.g., features) of the function 415 and the minimum values of the function 415.

Due to the shape of the function 415 (e.g., including the angles and the slope) the system 200 may be able to estimate future temperature data (e.g., estimated data 445). The system 200 may estimate the predicted period 420 based on the function 415 and the estimated data 445 (e.g., predicting the temperature data 405 for the future). In such cases, the system 200 may estimate the next occurrence when a decrease in temperature from the maximum of the function 415 may occur that may be an indication of a predicted period 420. The system 200 may estimate a future temperature data, future heart rate data, or both based on fitting the received temperature data 405 to the function 415. In such cases, the timing diagram 400 may include the estimated data 445. The future menstrual cycle onset day (e.g., predicted period 420) may be estimated based on identifying the future temperature data as estimated data 445.

In some cases, the system 200 may receive, via the user device 106, an indication of a period 410 (e.g., menstrual cycle). In such cases, the system 200 may estimate predicted period 420 based on receiving the indication, as described with reference to FIG. 3 . . . . In other examples, the system 200 may determine the period by estimating the predicted period. The system 200 may use the period 410 and the temperature data 405 to determine the function 415, thereby estimating the predicted period 420, as described with reference to FIG. 3.

The system 200 may determine a high temperature window and identify the predicted luteal phase 425 based on high temperature window. For example, the system 200 may identify that the temperature data 405 satisfies a threshold 440 for at least a portion of a time interval 435 based on fitting the received temperature data 405 to the function 415. The system 200 may determine that the temperature data 405 exceeds the threshold 440 for at least the portion of time interval 435. In such cases, the system 200 may estimate a predicted luteal phase 425 (e.g., future luteal onset phase of the menstrual cycle) based on identifying that the temperature data 405 satisfies the threshold 440. For example, the system 200 may identify that the estimated data 445 satisfies the threshold 440 based on fitting the received temperature data 405 to the function 415 and the estimated data 445.

In some cases, the predicted period 420 may be estimated based on estimating the predicted luteal phase 425. A predicted luteal phase 425 may be defined as a duration of time that the user experiences high temperatures. For example, a user may experience a predicted luteal phase 425 that is indicated by an increase in temperature. The luteal phase is a stage of the menstrual cycle that occurs after ovulation and before a first day of the period. In such cases, the period start date (e.g., predicted period 420) may be the date immediately following the predicted luteal phase 425.

The system 200 may estimate a future ovulation day (e.g., predicted ovulation day 430) based on estimating the predicted luteal phase 425. A predicted ovulation day 430 may be defined as a duration of time that the user experiences the release of an egg from the ovaries. Ovulation is a stage of the menstrual cycle that occurs before the luteal phase. The system 200 may utilize the historical temperature data 405 and determine when the high temperature window (i.e., the predicted luteal phase 425) may be, and identify the predicted ovulation day 430 as the day before the predicted luteal phase.

In some cases, the user may be able to scroll through the timing diagram 400 to view the estimation of the body temperature variation and cycle phases for the upcoming phases. In such cases, the system 200 may cause the GUI to display the timing diagram 400 or a portion of the timing diagram 400. The system 200 may balance between a longer-term view that allows the user to see recurring cycle patterns and monthly cycle view that allows the user to see tags associated with the menstrual cycle (e.g., period 410, predicted period 420, predicted ovulation day 430, and the like) at a glance. In such cases, the system 200 may help the user plan and schedule their activities and future events by taking their menstrual cycle into account.

The system 200 may estimate a predicted luteal phase 425 and predicted ovulation day 430 based on the collected data. In some cases, the servers 110 may transmit an indication of the predicted luteal phase 425 and predicted ovulation day 430 to the user device 106 after estimating the predicted luteal phase 425 and predicted ovulation day 430. In other examples, the user device 106 may generate the indication of the predicted luteal phase 425 and predicted ovulation day 430. In such cases, an indication of the predicted luteal phase 425 and predicted ovulation day 430 may be presented to the user via the GUI of the user device 106, as further understood with reference to FIG. 5.

In some cases, the system 200 may determine that an accuracy associated with using a first method (e.g., based on body temperature) to predict an onset of a period 420 falls below a reliability threshold. For example, the system 200 may identify that an accuracy associated with predicting a future menstrual cycle onset day (e.g., a first day of the predicted period 420) falls below a threshold in response to not being able to accurately fit the received temperature data of a user to the trigonometric or polynomial function. In such cases, the system 200 may determine that using the temperature data 405 to estimate the future menstrual cycle onset day is less reliable than other methods (e.g., other algorithms that don't rely on temperature data fitting a trigonometric or polynomial function, or the calendar method). For example, if the frequency of the function 415 exceeds a frequency threshold (e.g., is too high) or is below the frequency threshold (e.g., is too low), the system 200 may identify that the temperature data is not going to provide a sufficiently accurate basis for a menstrual cycle onset day prediction. In some examples, the system 200 may determine that the wavelength of the function 415 exceeds or falls below a wavelength threshold (e.g., is too short or too long), and in such cases, the system 200 may similarly determine to use a different algorithm or technique for predicting the future menstrual cycle onset day based on the temperature data not being sufficiently reliable for the prediction.

In such cases, the system 200 may switch from estimating the predicted period 420 using the user's temperate data 405 to a second method. For example, the system 200 may switch to the second method that estimates the future menstrual cycle onset day (e.g., the first day of the predicted period 420) in response to identifying that the temperature data is not going to provide a sufficiently reliable basis for the prediction. The second method to estimate the future menstrual cycle onset day may include a calendar method or an alternative period prediction method (e.g., that uses inputs other than or in addition to received temperature). The system 200 may estimate the future menstrual cycle onset day with the calendar method by utilizing user input. In such cases, the user input may include an indication of the first day of the previous period 410, a duration of time between the first days of the user's previous periods (e.g., a length of the user's menstrual cycle), or both.

In some examples, the system 200 may refrain from switching to the second method. For example, the system 200 may determine that the temperature data 405 appears temporarily unreliable for a day or more of the menstrual cycle due to stress, illness, and the like. However, the system 200 may refrain from switching to the second method until the temperature data 405 satisfies a threshold of unreliability for a portion of the time interval of the menstrual cycle. In such cases, the system 200 may switch to the second method for the user's next menstrual cycle. In some cases, the system 200 may switch back to estimating the predicted period 420 using the user's temperate data 405. For example, the system 200 may determine that the temperature data 405, the function 415, the predicted period 420, or a combination thereof are capable of providing an accurate prediction, and the system 200 may switch back to estimating the predicted period 420 using the user's temperate data 405.

Figure 5A:
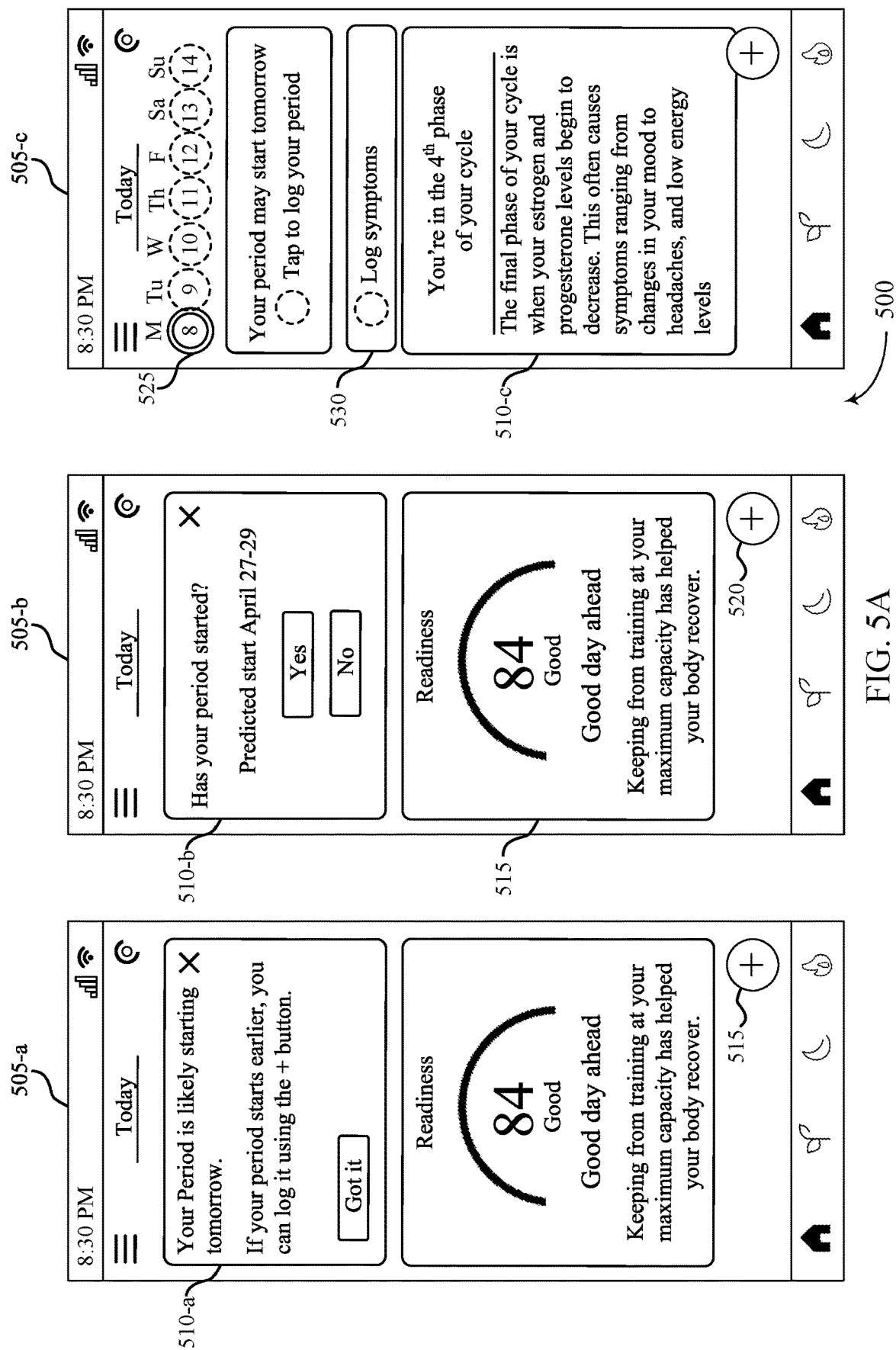
FIGS. 5A and 5B illustrates an example of a graphical user interface (GUI) that supports techniques for predicting menstrual cycle onset in accordance with aspects of the present disclosure.
Figure 5B:
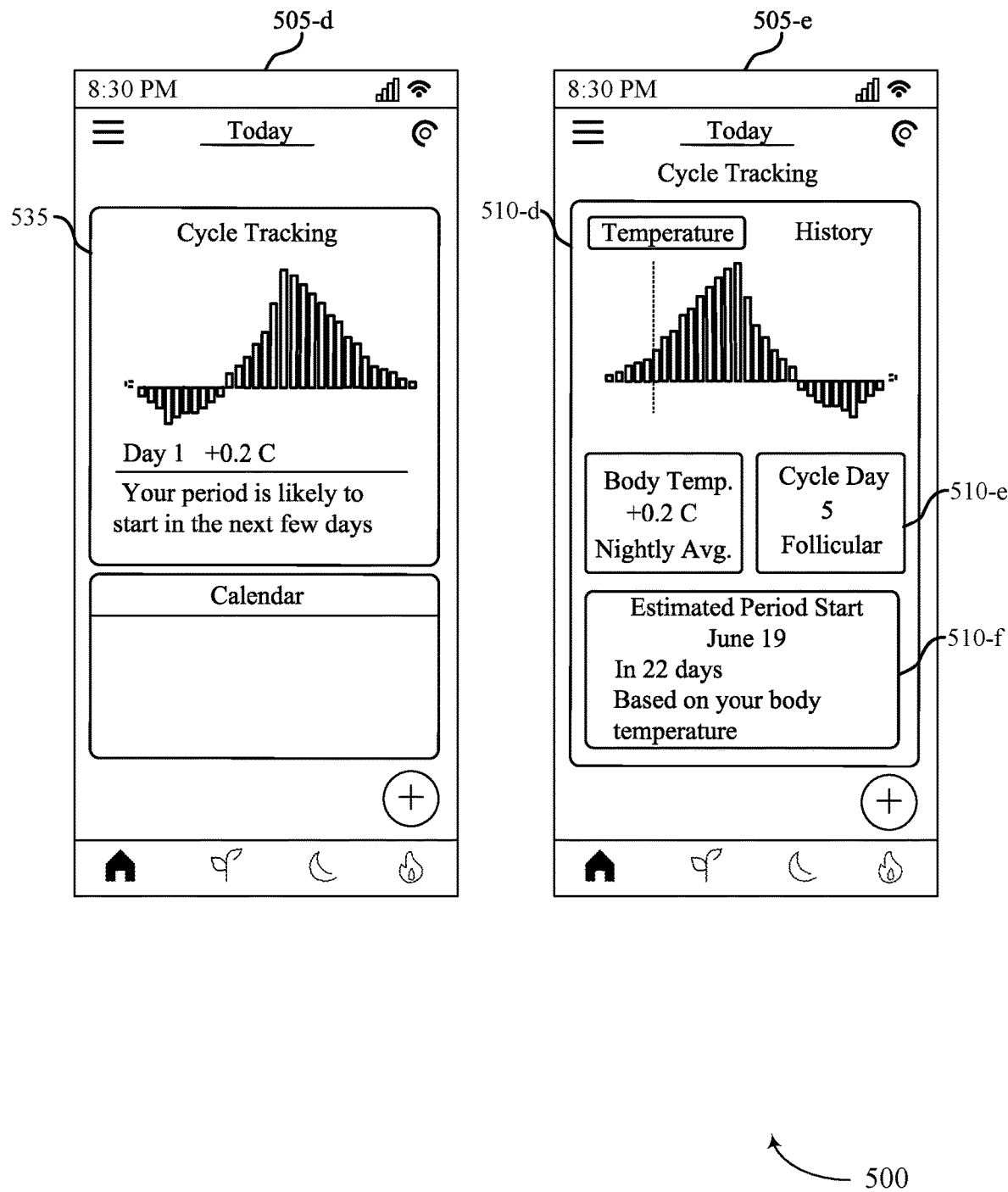

FIG. 5 illustrates an example of a GUI 500 that supports techniques for predicting menstrual cycle onset in accordance with aspects of the present disclosure. The GUI 500 may implement, or be implemented by, aspects of the system 100, system 200, timing diagram 300, timing diagram 400, or any combination thereof. For example, the GUI 500 may be an example of a GUI 275 of a user device 106 (e.g., user device 106-a, 106-b, 106-c) corresponding to a user 102.

In some examples, the GUI 500 illustrates a series of application pages 505 that may be displayed to a user via the GUI 500 (e.g., GUI 275 illustrated in FIG. 2). The server 110 of system 200 may cause the GUI 500 of the user device 106 (e.g., mobile device) to display inquiries of whether the user activates the period mode, ovulation mode, and the like and wants to track their menstrual cycle and identify a phase of the menstrual cycle that the user is experiencing (e.g., menstruation, ovulation, or the uterine cycle). In such cases, the system 200 may generate a personalized cycle tracking experience on the GUI 500 of the user device 106 to estimate a first day of the menstrual cycle based on the contextual tags and user questions.

Continuing with the examples above, prior to estimating a future menstrual cycle onset day, the user may be presented with an application page upon opening the wearable application 250. The application page may display a request to activate the period mode, ovulation mode, and the like and enable the system 200 to track the menstrual cycle and identify the phase of the menstrual cycle that the user is experiencing (e.g., menstruation, ovulation, or the uterine cycle). In such cases, the application page may display an invitation card where the users are invited to enroll in the menstrual cycle tracking applications. The application page may display a prompt to the user to verify whether the menstrual cycle may be tracked or dismiss the message if the menstrual cycle is not tracked.

In some cases, if the user does not have history data (e.g., temperature data for at least 60 calendar days), the system 200 may utilize the calendar method until the system 200 may predict the future menstrual cycle onset day based on the trigonometric and polynomial functions and the calculated duration from the feature of the trigonometric and polynomial functions and the menstrual cycle onset. The system 200 may receive an indication of whether the user selects to opt-in to tracking the menstrual cycle or opt-out to tracking the menstrual cycle.

The user may be presented with an additional application page upon selecting "yes" to tracking the menstrual cycle.

The application page may display a prompt to the user to verify the main reason to track the cycle (e.g., period, ovulation, pregnancy, etc.). In such cases, the application page may prompt the user to confirm the intent of tracking the menstrual cycle. For example, the system 200 may receive, via the user device 106, a confirmation of the intended use of the menstrual tracking system.

In some cases, the user may be presented with an additional application page upon confirming the intent. The application page may display a prompt to the user to verify the average cycle length (e.g., duration between a first day of a first menstrual cycle and a first day of a second menstrual cycle). In some cases, the application page may display a prompt to the user to indicate whether the user experiences irregular cycles in which an average cycle length may not be determined. For example, the system 200 may receive, via the user device 106, a confirmation of the average cycle length.

The user may be presented with an additional application page upon inputting the average cycle length or irregular cycle. The application page may display a prompt to the user to verify the last cycle start date (e.g., a first day of the most recent menstrual cycle). The application page may display a prompt to the user to indicate whether the user may be unable to identify the last cycle start date. For example, the system 200 may receive, via the user device 106, a confirmation of the last cycle start date.

In some cases, the user may be presented with an additional application page upon confirming the last cycle start date. The application page may display a prompt to the user to verify whether the user uses hormonal contraceptives in use. For example, the system 200 may receive, via the user device 106, a confirmation of whether hormonal contraceptives are in use. Upon confirming that hormonal contraceptives are not in use, the user may be presented with a GUI that may be further shown and described with reference to FIG. 5.

The server 110 of system 200 may cause the GUI 500 of the user device 106 (e.g., mobile device) to display an indication of the predicted period onset (e.g., via application page 505-*a*, 505-*b*, 505-*c*, 505-*d*, or 505-*e*). In such cases, the system 200 may output the predicted period onset on the GUI 500 of the user device 106 to indicate that the user is experiencing a first day of the menstrual cycle.

Continuing with the example above, upon estimating a future menstrual cycle onset day, the user may be presented with the application page 505-*a* upon opening the wearable application 250. As shown in FIG. 5, the application page 505-*a* may display an indication that a first day of the menstrual cycle was predicted via message 510-*a*. In such cases, the application page 505-*a* may include the message 510-*a* on the home page. In cases where a user's period onset day may be predicted, as described herein, the server 110 may transmit a message 510-*a* to the user, where the message 510-*a* is associated with the predicted period onset for the user.

For example, the user may receive message 510-*a*, that may indicate a date of when the period onset day is predicted, a date range including the day the period onset day is predicted, a duration of time until the predicted period onset, and the like. For example, the message 510-*a* may indicate that the period is likely starting tomorrow, in 5-7 days, or indicate a date of the predicted period onset day (e.g., predicted period start date is August 28th) or a range of dates of the predicted period onset day (e.g., predicted period start date April 27-29th). In such cases, the range may include the day of the predicted period onset day and the day before and after the predicted onset day. For example, the range may include three days. In some cases, the range may include the day of the predicted period onset day and two days before and after the predicted onset day. For example, the range may include five days. In some examples, the message 510 may indicate that the user is currently ovulating or predicted to ovulation in a given range of dates. The messages 510 may be configurable/customizable, such that the user may receive different messages 510 based on the predicted period onset, as described previously herein.

As shown in FIG. 5, the application page 505-*b* may display an indication of whether the predicted first day of the menstrual cycle occurred via message 510-*b*. The user may receive message 510-*b*, that may prompt the user to verify whether the predicted period onset day has occurred or dismiss the message 510-*b* if the predicted period onset day has not occurred. In such cases, the application page 505-*b* may prompt the user to confirm or dismiss the predicted period (e.g., confirm/deny whether the system 200 correctly determined that the user experienced a first day of the period). For example, the system 200 may receive, via the user device 106 and in response to estimating the future menstrual cycle onset day, a confirmation of the estimated future menstrual cycle onset day. Additionally, in some implementations, the application page 505-*b* may display one or more scores (e.g., Sleep Score, Readiness Score 515) for the user for the respective day.

The application pages 505 may display a period card or ovulation card such as a "predicted period confirmation card" that indicates that the predicted period has been recorded. In some implementations, upon confirming that the predicted period is valid, the period may be recorded/logged in an activity log for the user for the respective calendar day. Moreover, in some cases, the period may be used to update (e.g., modify) one or more scores associated with the user (e.g., Sleep Score, Readiness Score 515). That is, data associated with the predicted period (e.g., future menstrual cycle onset day) may be used to update the scores for the user for the following calendar day after the first day of the period was confirmed.

In some cases, the Readiness Score 515 may be updated based on the predicted period onset day. For example, an elevated body temperature prior to the predicted period onset day may cause the system 200 to alert the user about their body signals (e.g., elevated body temperature). In such cases, the Readiness Score 515 may indicate to the user to "pay attention" based on the phase of the menstrual cycle (e.g., that the predicted period onset day is approaching). If the Readiness Score 515 changes for the user, the system 200 may implement a cycle recovery mode for users whose cycle symptoms may be severe and may benefit from adjusted activity and readiness guidance for a couple of days. In other examples, the Readiness Score 515 may be updated based on the Sleep Score and elevated body temperatures. However, the system 200 may determine that the user is experiencing the menstrual period and may adjust (e.g., increase) the Readiness Score 515 and/or Sleep Score to offset the effects of the menstrual cycle.

In some cases, the messages 510 displayed to the user via the GUI 500 of the user device 106 may indicate how the predicted period onset day affected the overall scores (e.g., overall Readiness Score 515) and/or the individual contributing factors. For example, a message may indicate "It looks like your body is under strain right now, but if you're feeling ok, doing a light or medium intensity exercise can help your body battle the symptoms" or "From your recovery metrics it looks like your body is still doing ok, so some light activity can help relieve the symptoms. Hope you'll feel better tomorrow!" In cases where the timing/duration of the predicted period onset was not optimal, the messages 510 may provide suggestions for the user in order to improve their general health. For example, the message 510 may indicate "If you feel really low on energy, why not switch to rest mode for today," or "Since you have cramps and a headache, devote today for rest." In such cases, the messages 510 displayed to the user may provide targeted insights to help the user adjust their lifestyle during a portion of the menstrual cycle (e.g., during menstruation, ovulation, or the uterine cycle).

For users whose body signals (e.g., body temperature, heart rate, HRV, and the like) may react to the phase of the menstrual cycle, the system 200 may display low activity goals around the menstrual cycle start date. In such cases, accurately predicting the period onset day may increase the accuracy and efficiency of the Readiness Score 515 and Activity Scores. In some cases, the system 200 may provide training insights and recommendations for athletes and other users during a portion of their menstrual cycle (i.e., suggesting increased intensity workouts during the first half of their cycle and lower intensity workouts during the second half of their cycle).

In cases where the user dismisses the prompt (e.g., message 510-*b*) on application page 505-*b*, the prompt may disappear, and the user may input an indication of a first day of the period, ovulation, and the like via input 520 at a later time. For example, if the user's period occurs after the predicted period onset day, the system 200 may display the message 510-*b* every day during the predicted range of days. If the user's period does not occur during the range of predicted days, then the system 200 may prompt the user to input the period start date, via input 520, when the period occurs. In some cases, the system 200 may display via message 510-*b* a prompt asking the user if the user is pregnant or suggests switching to an alternative mode (e.g., pregnancy mode) or deactivating period mode or ovulation mode.

In other examples, if the user's period starts early (i.e., the first day of the period occurs before the predicted period onset), the user may submit an indication of the first day of the period onset via input 520. In some cases, estimating the first day of the period may be based on receiving the indication of the period. For example, the server of system 200 may receive user input, via input 520, information associated with the first day of a previous period.

Conversely, upon confirming the predicted period onset on application page 505-*b*, the GUI 500 may display a portion of application page 505-*c*. The application page 505-*c* may indicate one or more parameters of the period, including a temperature, heart rate, HRV, and the like experienced by the user during the menstrual cycle.

In some cases, application page 505-*c* may include a calendar view 525 that may indicate a current date that the user is viewing application page 505-*c* and a date range including the day when the menstrual cycle phase (e.g., period onset day, ovulation, etc.) is predicted. For example, the date range may encircle the calendar days using a dashed line configuration and the current day may shade-in the calendar day. The calendar view 525 may also include a message including the current calendar day and indication of the day of the user's cycle (e.g., 28th day of cycle).

In some cases, the user may log symptoms via prompt 530. For example, the system 200 may receive user input (e.g., tags) to log symptoms associated with the period, ovulation, or the like (e.g., flow, cramps, headaches, hot flashes, migraine, pain, pregnancy, etc.). The system 200 may recommend tags to the user based on user history and the predicted period onset day.

Application page 505-*c* may also include message 510-*c* that includes insights, recommendations, and the like associated with the period. The server 110 of system 200 may cause the GUI 500 of the user device to display a message 510-*c* associated with the predicted period (e.g., estimated future menstrual cycle onset day). The user device 106 may display recommendations and/or information associated with the period via message 510-*c*. As noted previously herein, an accurately predicted period may be beneficial to a user's overall health. In some implementations, the user device 106 and/or servers 110 may generate alerts (e.g., messages 510-*c*, insights) associated with the menstrual cycle that may be displayed to the user via the GUI 500 (e.g., application page 505-*c*). In particular, messages 510-*c* generated and displayed to the user via the GUI 500 may be associated with one or more characteristics (e.g., time of day, duration) of the predicted period.

For example, the message 510-*c* may include a time of day that the future menstrual cycle onset day occurred, a duration between the future menstrual cycle onset day and a previous menstrual cycle onset day, a time interval that the future menstrual cycle onset day is predicted to occur, a request to input symptoms associated with the future menstrual cycle onset day, or a combination thereof. In some cases, the message 510-*c* may display a recommendation of how the user may adjust their lifestyle in the days leading up to the predicted period onset, on the day of the predicted period onset, and/or in the days after the predicted period onset. In some examples, if the user tags "cramps" on cycle day 21 for the previous cycles, the system 200 may display via message 510-*c* a prompt that suggests logging "cramps" via prompt 530 on or near cycle day 21. In other examples, the system 200 may recommend a time (e.g., calendar day) for the user to be active or estimate a restorative time following the predicted period onset.

In some implementations, the system 200 may provide additional insight regarding the user's predicted period onset. For example, the application pages 505 may indicate one or more physiological parameters (e.g., contributing factors) that resulted in the user's predicted period onset, such as increased temperature, and the like. In other words, the system 200 may be configured to provide some information or other insights regarding the predicted period onset. Personalized insights may indicate aspects of collected physiological data (e.g., contributing factors within the physiological data) that were used to generate the predicted period onset.

In some implementations, the system 200 may be configured to receive user inputs regarding detected/predicted period onsets in order to train classifiers (e.g., supervised learning for a machine learning classifier) and improve menstrual tracking techniques. For example, the user device may display a predicted period onset day or range of days indicating a relative likelihood that the user will experience a first day of a period. Subsequently, the user may input one or more user inputs, such as an onset of symptoms, a confirmation of the period onset, and the like. These user inputs may then be input into the classifier to train the classifier. In other words, the user inputs may be used to validate, or confirm, the predicted period.

In some examples, the system 200 may be configured to adjust the predicted period onset based on the user inputs such as onset of symptoms. For example, the system 200 may estimate 6 days for the predicted period onset, but the system 200 may receive user input of cramps on day 2. The system 200 may identify a pattern of user inputs indicating cramps that occur a day prior to the predicted period onset. In such cases, the system 200 may adjust the predicted period onset to be 3 days. In some cases, the system 200 may be configured to adjust the predicted period onset based on the user inputs such as a phase of the menstrual cycle and symptoms associated with the phase. For example, the system 200 may receive user input of ovulation and symptoms associated with ovulation. The system 200 may identify a pattern of user inputs indicating ovulation that occur ten days prior to the predicted period onset. In such cases, the system 200 may adjust the predicted period onset to be 10 days from the received user input of ovulation.

In some cases, the user may be presented with the application page 505-d after opening the wearable application 250. The application page 505-d may display a cycle tracking card 535. In some examples, the cycle tracking card 535 may be displayed on the home page. The cycle tracking card 535 may display an indication of the user's temperature data, as described with reference to FIGS. 3 and 4. In some examples, the cycle tracking card 535 may display an indication of the current day of the user's menstrual cycle (e.g., day 1) and an indication of the user's change in temperature relative to the previous day. In such cases, the cycle tracking card 535 may indicate whether the user's temperature increased, decreased, or stayed the same relative to the previous day of the menstrual cycle. The cycle tracking card 535 may indicate a time frame of when the period onset day is predicted. For example, the cycle tracking card 535 may indicate "Your period is likely to start in the next few days" or "Your period is likely to start from April 1st through April 5th." In some cases, the cycle tracking card 535 may provide some information or other insights regarding delays in the user's period, patterns in period predictions, uncommon circumstances related to a user's period (e.g., sickness, stress, etc.), or a combination thereof.

In some examples, the user may be presented with the application page 505-e after opening the cycle tracking card 535. The application page 505-e may include a message 510-d. The message 510-d may indicate the user's temperature data, as described with reference to FIG. 3. In some cases, the message 510-d may indicate a current day of the user's menstrual cycle relative to the user's previously collected temperature data and the user's estimated future temperature data, as described with reference to FIG. 4. In some examples, the message 510-e may display an indication of the current day of the user's menstrual cycle (e.g., cycle day 5) and an indication of the current menstrual cycle phase of the user's menstrual cycle (e.g., follicular phase) based on the current day of the user's menstrual cycle.

Figure 6:
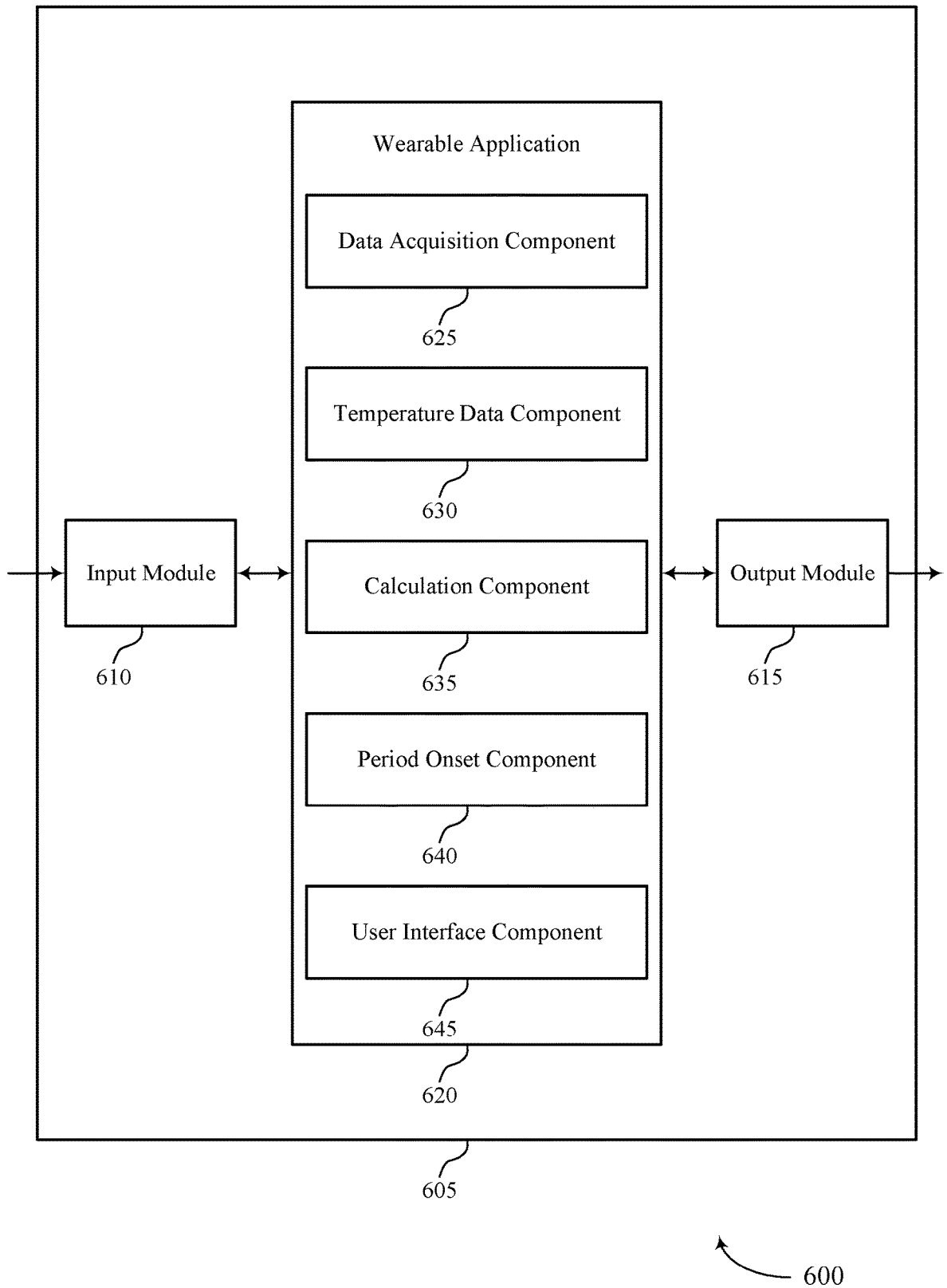
FIG. 6 shows a block diagram of an apparatus that supports techniques for predicting menstrual cycle onset in accordance with aspects of the present disclosure.

The application page 505-e may include a message 510-f. The message 510-f may indicate an estimated period start date, a duration of time (e.g., an amount of days) until the estimated period start date, an indication of the method used to determine the estimated period start date, or a combination thereof. For example, the message 510-f may indicate whether the system 200 estimated the period start date based on the user's body temperature, as described with reference to FIGS. 3 and 4, based on a calendar method, or based on a different period prediction algorithm. In such cases, if the system 200 switches between different methods to estimate the period start, the message 510-f may automatically display an indication of the current method that is utilized by the system 200. In some cases, the application page 505-e may indicate whether the user is experiencing irregular periods, shorter periods relative to their average period length, longer periods relative to their average period length, a delay in their period, or a combination thereof. FIG. 6 shows a block diagram 600 of a device 605 that supports techniques for predicting menstrual cycle onset in accordance with aspects of the present disclosure. The device 605 may include an input module 610, an output module 615, and a wearable application 620. The device 605 may also include a processor. Each of these components may be in communication with one another (e.g., via one or more buses).

The input module 610 may provide a means for receiving information such as packets, user data, control information, or any combination thereof associated with various information channels (e.g., control channels, data channels, information channels related to illness detection techniques). Information may be passed on to other components of the device 605. The input module 610 may utilize a single antenna or a set of multiple antennas.

The output module 615 may provide a means for transmitting signals generated by other components of the device 605. For example, the output module 615 may transmit information such as packets, user data, control information, or any combination thereof associated with various information channels (e.g., control channels, data channels, information channels related to illness detection techniques). In some examples, the output module 615 may be co-located with the input module 610 in a transceiver module. The output module 615 may utilize a single antenna or a set of multiple antennas.

For example, the wearable application 620 may include a data acquisition component 625, a temperature data component 630, a calculation component 635, a period onset component 640, a user interface component 645, or any combination thereof. In some examples, the wearable application 620, or various components thereof, may be configured to perform various operations (e.g., receiving, monitoring, transmitting) using or otherwise in cooperation with the input module 610, the output module 615, or both. For example, the wearable application 620 may receive information from the input module 610, send information to the output module 615, or be integrated in combination with the input module 610, the output module 615, or both to receive information, transmit information, or perform various other operations as described herein.

The wearable application 620 may support detecting a menstrual cycle onset in accordance with examples as disclosed herein. The data acquisition component 625 may be configured as or otherwise support a means for receiving physiological data associated with a user from a wearable device, the physiological data comprising at least temperature data. The temperature data component 630 may be configured as or otherwise support a means for fitting the received temperature data to a trigonometric or polynomial function comprising a plurality of features. The calculation component 635 may be configured as or otherwise support a means for calculating a duration between the plurality of features and a corresponding plurality of menstrual cycle onset days. The period onset component 640 may be configured as or otherwise support a means for estimating a future menstrual cycle onset day that the user experiences a first day of a menstrual cycle based at least in part on applying the duration to a most recent feature of the trigonometric or polynomial function. The user interface component 645 may be configured as or otherwise support a means for causing a graphical user interface of a user device to display an indication of the estimated future menstrual cycle onset day.

Figure 7:
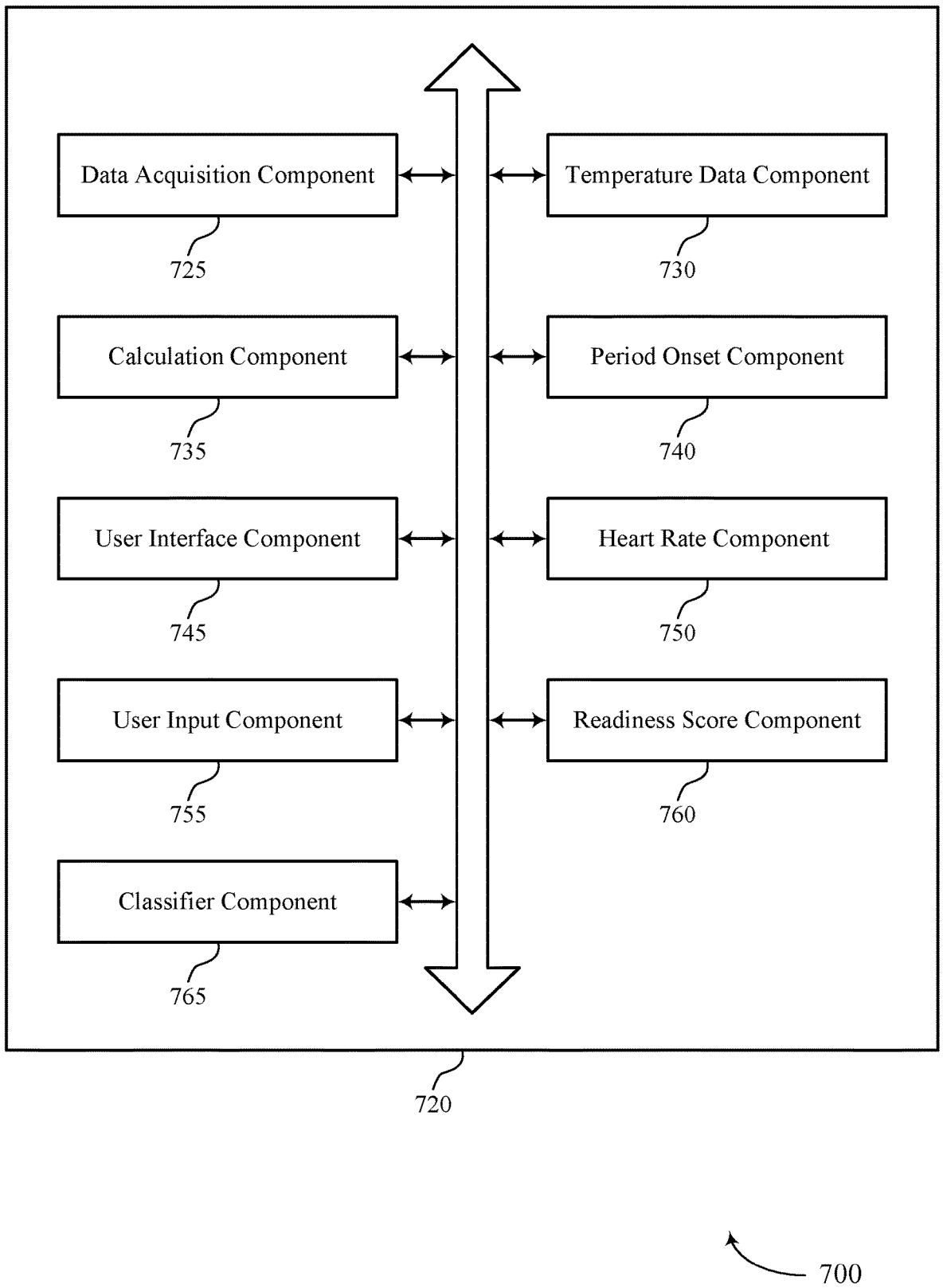
FIG. 7 shows a block diagram of a wearable application that supports techniques for predicting menstrual cycle onset in accordance with aspects of the present disclosure.

FIG. 7 shows a block diagram 700 of a wearable application 720 that supports techniques for predicting menstrual cycle onset in accordance with aspects of the present disclosure. The wearable application 720 may be an example of aspects of a wearable application or a wearable application 620, or both, as described herein. The wearable application 720, or various components thereof, may be an example of means for performing various aspects of techniques for predicting menstrual cycle onset as described herein. For example, the wearable application 720 may include a data acquisition component 725, a temperature data component 730, a calculation component 735, a period onset component 740, a user interface component 745, a heart rate component 750, a user input component 755, a Readiness Score component 760, a classifier component 765, or any combination thereof. Each of these components may communicate, directly or indirectly, with one another (e.g., via one or more buses).

The wearable application 720 may support detecting a menstrual cycle onset in accordance with examples as disclosed herein. The data acquisition component 725 may be configured as or otherwise support a means for receiving physiological data associated with a user from a wearable device, the physiological data comprising at least temperature data. The temperature data component 730 may be configured as or otherwise support a means for fitting the received temperature data to a trigonometric or polynomial function comprising a plurality of features. The calculation component 735 may be configured as or otherwise support a means for calculating a duration between the plurality of features and a corresponding plurality of menstrual cycle onset days. The period onset component 740 may be configured as or otherwise support a means for estimating a future menstrual cycle onset day that the user experiences a first day of a menstrual cycle based at least in part on applying the duration to a most recent feature of the trigonometric or polynomial function. The user interface component 745 may be configured as or otherwise support a means for causing a graphical user interface of a user device to display an indication of the estimated future menstrual cycle onset day.

In some examples, the temperature data component 730 may be configured as or otherwise support a means for fitting the received temperature data to a first trigonometric or polynomial function comprising a first quantity of a first plurality of features for a first time interval. In some examples, the temperature data component 730 may be configured as or otherwise support a means for fitting the received temperature data to a second trigonometric or polynomial function comprising a second quantity of a second plurality of features for a second time interval, wherein the second quantity of the second plurality of features is greater than the first quantity of the first plurality of features. In some examples, the calculation component 735 may be configured as or otherwise support a means for selecting the second trigonometric or polynomial function based at least in part on fitting the received temperature data to the first trigonometric or polynomial function and the second trigonometric or polynomial function, wherein calculating the duration between the plurality of features and the corresponding plurality of menstrual cycle onset days is based at least in part on selecting the second trigonometric or polynomial function.

In some examples, the physiological data further comprises heart rate data, and the heart rate component 750 may be configured as or otherwise support a means for determining that the received heart rate data satisfies a threshold for at least a portion of a time interval. In some examples, the physiological data further comprises heart rate data, and the temperature data component 730 may be configured as or otherwise support a means for filtering out the received temperature data during at least the portion of the time interval based at least in part on determining that the received heart rate data satisfies the threshold, wherein fitting the received temperature data to the trigonometric or polynomial function is based at least in part on filtering out the received temperature data.

In some examples, the temperature data component 730 may be configured as or otherwise support a means for identifying a baseline temperature associated with the user based at least in part on receiving the physiological data, wherein the baseline temperature comprises a nighttime temperature baseline. In some examples, the temperature data component 730 may be configured as or otherwise support a means for determining that a temperature deviation from the baseline temperature satisfies a threshold during at least a portion of a time interval based at least in part on identifying the baseline temperature. In some examples, the temperature data component 730 may be configured as or otherwise support a means for filtering out the received temperature data during at least the portion of the time interval based at least in part on determining that the temperature deviation satisfies the threshold, wherein fitting the received temperature data to the trigonometric or polynomial function is based at least in part on filtering out the received temperature data.

In some examples, the temperature data is continuously collected by the wearable device.

In some examples, the user input component 755 may be configured as or otherwise support a means for receiving, via the user device, an indication of the corresponding plurality of menstrual cycle onset days, wherein estimating the future menstrual cycle onset day is based at least in part on receiving the indication.

In some examples, the temperature data component 730 may be configured as or otherwise support a means for estimating a future temperature data based at least in part on fitting the received temperature data to the trigonometric or polynomial function, wherein estimating the future menstrual cycle onset day is based at least in part on estimating the future temperature data.

In some examples, the temperature data component 730 may be configured as or otherwise support a means for identifying that the temperature data satisfies a threshold for at least a portion of a time interval based at least in part on fitting the received temperature data to the trigonometric or polynomial function. In some examples, the period onset component 740 may be configured as or otherwise support a means for estimating a future luteal onset phase of the menstrual cycle during the portion of the time interval based at least in part on identifying that the temperature data satisfies the threshold, wherein estimating the future menstrual cycle onset day is based at least in part on estimating the future luteal onset phase of the menstrual cycle.

In some examples, the period onset component 740 may be configured as or otherwise support a means for estimating a future ovulation day based at least in part on estimating the future luteal onset phase of the menstrual cycle.

In some examples, the Readiness Score component 760 may be configured as or otherwise support a means for updating a Readiness Score associated with the user based at least in part on the future menstrual cycle onset day.

In some examples, the classifier component 765 may be configured as or otherwise support a means for inputting the physiological data into a machine learning classifier, wherein estimating the future menstrual cycle onset day is based at least in part on inputting the physiological data into the machine learning classifier.

In some examples, the user input component 755 may be configured as or otherwise support a means for receiving, via the user device and in response to estimating the future menstrual cycle onset day, a confirmation of the estimated future menstrual cycle onset day.

In some examples, the user input component 755 may be configured as or otherwise support a means for receiving, via the user device, an indication of a menstrual cycle onset day, wherein estimating the future menstrual cycle onset day is based at least in part on receiving the indication of the menstrual cycle onset day.

In some examples, the period onset component 740 may be configured as or otherwise support a means for identifying that the future menstrual cycle onset day satisfies a threshold based at least in part on fitting the received temperature data to the trigonometric or polynomial function and switching to a second method to estimate the future menstrual cycle onset day based at least in part on identifying that the future menstrual cycle onset day satisfies the threshold.

In some examples, the second method to estimate the future menstrual cycle onset day comprises a calendar method.

In some examples, the user interface component 745 may be configured as or otherwise support a means for causing the graphical user interface of the user device to display a message associated with the estimated future menstrual cycle onset day.

In some examples, the message comprises a time of day that the future menstrual cycle onset day occurred, a duration between the future menstrual cycle onset day and a previous menstrual cycle onset day, a time interval that the future menstrual cycle onset day is predicted to occur, a request to input symptoms associated with the future menstrual cycle onset day, or a combination thereof.

In some examples, the trigonometric or polynomial function comprises a sinusoidal function, a cosine function, a tangent function, a second degree polynomial function, or a third degree polynomial function.

In some examples, the plurality of features comprises a plurality of local maximum values, a plurality of local minimum values, or an axis intercept.

In some examples, the wearable device comprises a wearable ring device.

In some examples, the wearable device collects the physiological data from the user based on arterial blood flow.

Figure 8:
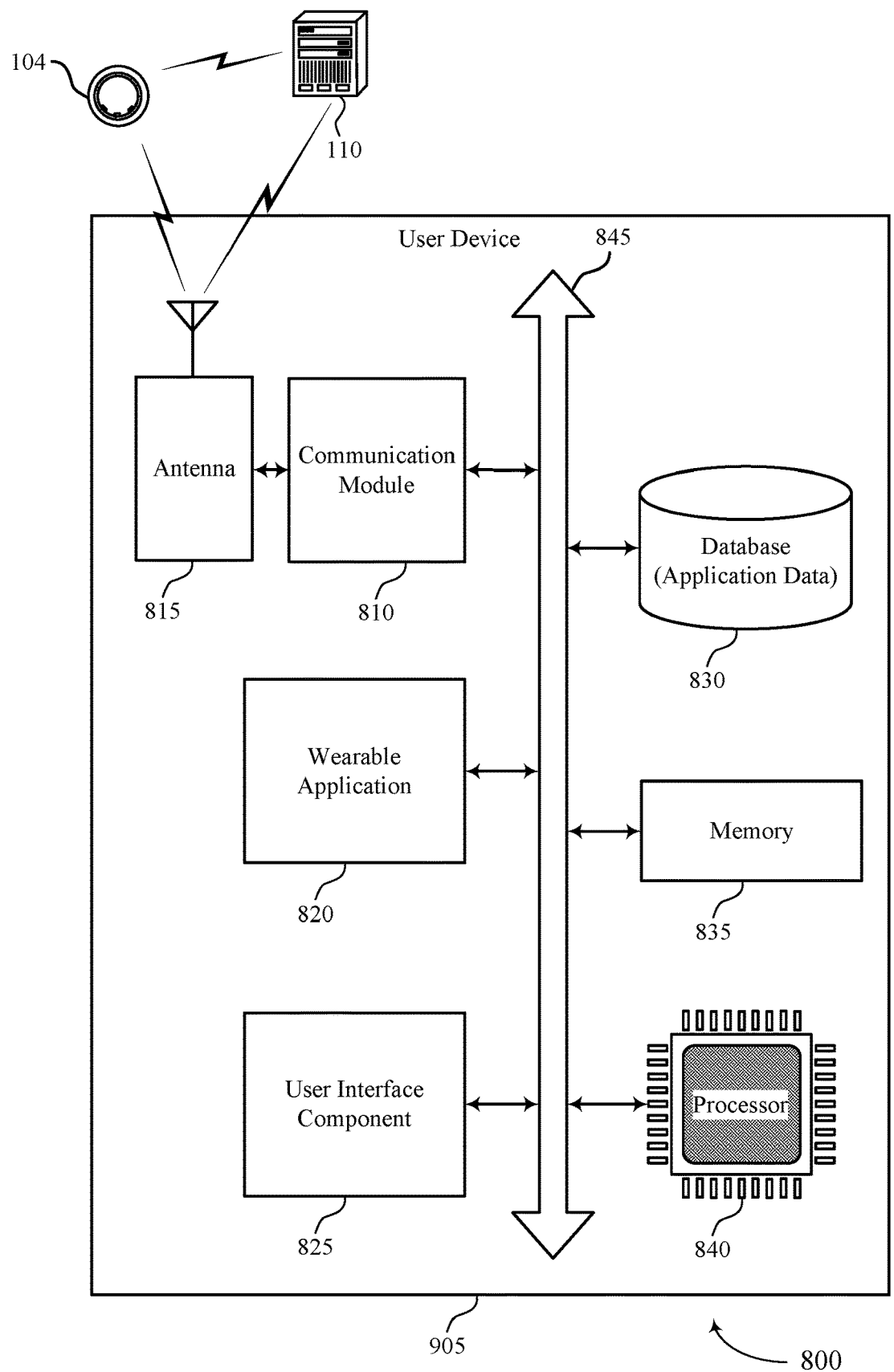
FIG. 8 shows a diagram of a system including a device that supports techniques for predicting menstrual cycle onset in accordance with aspects of the present disclosure.

FIG. 8 shows a diagram of a system 800 including a device 805 that supports techniques for predicting menstrual cycle onset in accordance with aspects of the present disclosure. The device 805 may be an example of or include the components of a device 605 as described herein. The device 805 may include components for bi-directional voice and data communications including components for transmitting and receiving communications, such as a wearable application 820, a communication module 810, an antenna 815, a user interface component 825, a database (application data) 830, a memory 835, and a processor 840. These components may be in electronic communication or otherwise coupled (e.g., operatively, communicatively, functionally, electronically, electrically) via one or more buses (e.g., a bus 845).

The communication module 810 may manage input and output signals for the device 805 via the antenna 815. The communication module 810 may include an example of the communication module 220-b of the user device 106 shown and described in FIG. 2. In this regard, the communication module 810 may manage communications with the ring 104 and the server 110, as illustrated in FIG. 2. The communication module 810 may also manage peripherals not integrated into the device 805. In some cases, the communication module 810 may represent a physical connection or port to an external peripheral. In some cases, the communication module 810 may utilize an operating system such as iOS®, ANDROID®, MS-DOS®, MS-WINDOWS®, OS/2®, UNIX®, LINUX®, or another known operating system. In other cases, the communication module 810 may represent or interact with a wearable device (e.g., ring 104), modem, a keyboard, a mouse, a touchscreen, or a similar device. In some cases, the communication module 810 may be implemented as part of the processor 840. In some examples, a user may interact with the device 805 via the communication module 810, user interface component 825, or via hardware components controlled by the communication module 810.

In some cases, the device 805 may include a single antenna 815. However, in some other cases, the device 805 may have more than one antenna 815, that may be capable of concurrently transmitting or receiving multiple wireless transmissions. The communication module 810 may communicate bi-directionally, via the one or more antennas 815, wired, or wireless links as described herein. For example, the communication module 810 may represent a wireless transceiver and may communicate bi-directionally with another wireless transceiver. The communication module 810 may also include a modem to modulate the packets, to provide the modulated packets to one or more antennas 815 for transmission, and to demodulate packets received from the one or more antennas 815.

The user interface component 825 may manage data storage and processing in a database 830. In some cases, a user may interact with the user interface component 825. In other cases, the user interface component 825 may operate automatically without user interaction. The database 830 may be an example of a single database, a distributed database, multiple distributed databases, a data store, a data lake, or an emergency backup database.

The memory 835 may include RAM and ROM. The memory 835 may store computer-readable, computer-executable software including instructions that, when executed, cause the processor 840 to perform various functions described herein. In some cases, the memory 835 may contain, among other things, a BIOS that may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory 835 to perform various functions (e.g., functions or tasks supporting a method and system for sleep staging algorithms).

The wearable application 820 may support detecting a menstrual cycle onset in accordance with examples as disclosed herein. For example, the wearable application 820 may be configured as or otherwise support a means for receiving physiological data associated with a user from a wearable device, the physiological data comprising at least temperature data. The wearable application 820 may be configured as or otherwise support a means for fitting the received temperature data to a trigonometric or polynomial function comprising a plurality of features. The wearable application 820 may be configured as or otherwise support a means for calculating a duration between the plurality of features and a corresponding plurality of menstrual cycle onset days. The wearable application 820 may be configured as or otherwise support a means for estimating a future menstrual cycle onset day that the user experiences a first day of a menstrual cycle based at least in part on applying the duration to a most recent feature of the trigonometric or polynomial function. The wearable application 820 may be configured as or otherwise support a means for causing a graphical user interface of a user device to display an indication of the estimated future menstrual cycle onset day.

By including or configuring the wearable application 820 in accordance with examples as described herein, the device 805 may support techniques for improved health tracking using data collected by a wearable device. In particular, techniques described herein may be used to predict menstrual cycle onset for a given user, that may be used to generate more accurate predictions for the user. By providing a user with a more comprehensive prediction of their menstrual cycle onsets, techniques described herein may enable the user to effectively adjust their lifestyle patterns, that may improve the overall health for the user.

The wearable application 820 may include an application (e.g., "app"), program, software, or other component that is configured to facilitate communications with a ring 104, server 110, other user devices 106, and the like. For example, the wearable application 820 may include an application executable on a user device 106 that is configured to receive data (e.g., physiological data) from a ring 104, perform processing operations on the received data, transmit and receive data with the servers 110, and cause presentation of data to a user.

Figure 9:
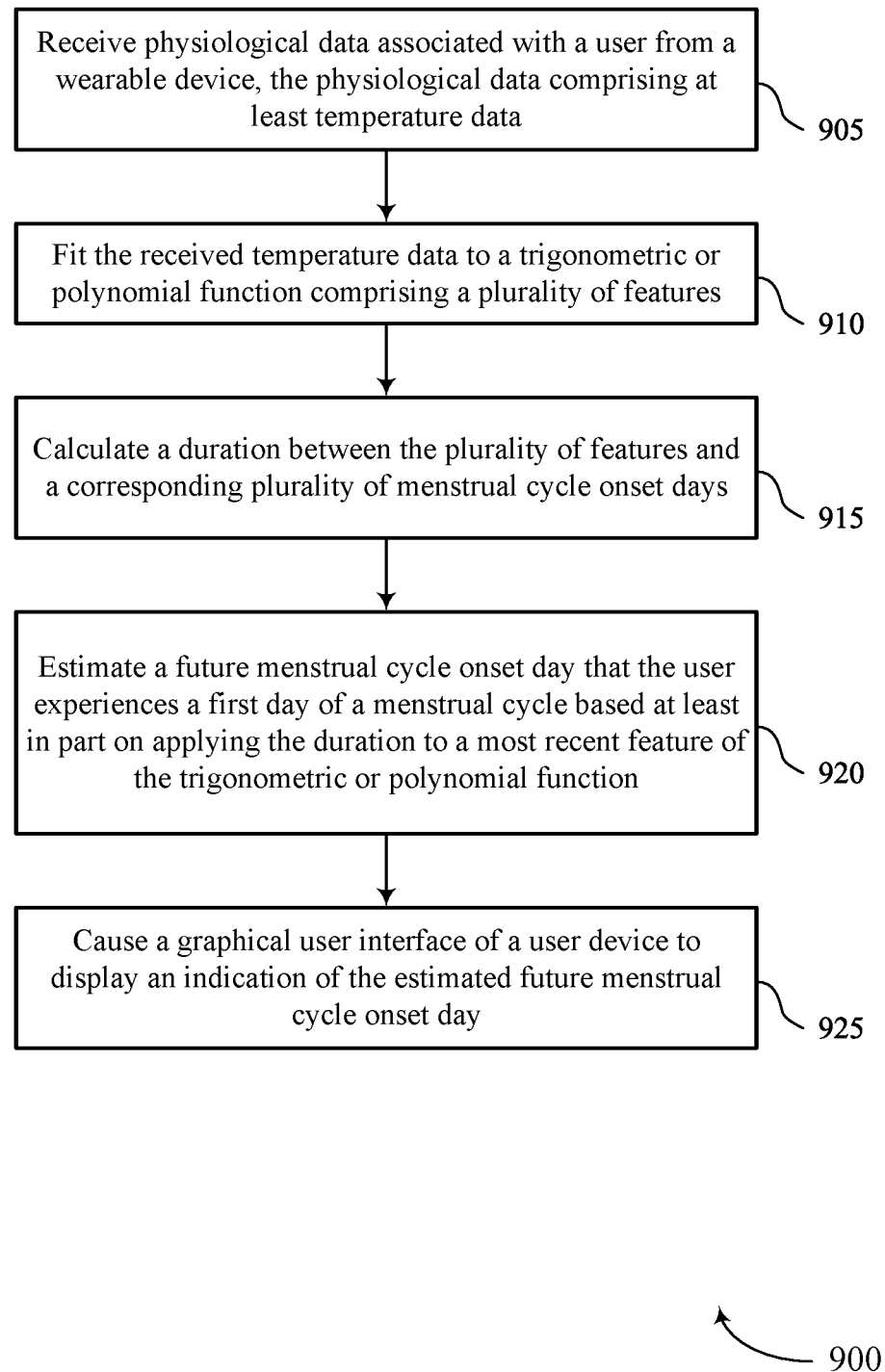
FIGS. 9 through 11 show flowcharts illustrating methods that support techniques for predicting menstrual cycle onset in accordance with aspects of the present disclosure.

FIG. 9 shows a flowchart illustrating a method 900 that supports techniques for predicting menstrual cycle onset in accordance with aspects of the present disclosure. The operations of the method 900 may be implemented by a user device or its components as described herein. For example, the operations of the method 900 may be performed by a user device as described with reference to FIGS. 1 through 8. In some examples, a user device may execute a set of instructions to control the functional elements of the user device to perform the described functions. Additionally or alternatively, the user device may perform aspects of the described functions using special-purpose hardware.

At 905, the method may include receiving physiological data associated with a user from a wearable device, the physiological data comprising at least temperature data. The operations of 905 may be performed in accordance with examples as disclosed herein. In some examples, aspects of the operations of 905 may be performed by a data acquisition component 725 as described with reference to FIG. 7.

At 910, the method may include fitting the received temperature data to a trigonometric or polynomial function comprising a plurality of features. The operations of 910 may be performed in accordance with examples as disclosed herein. In some examples, aspects of the operations of 910 may be performed by a temperature data component 730 as described with reference to FIG. 7.

At 915, the method may include calculating a duration between the plurality of features and a corresponding plurality of menstrual cycle onset days. The operations of 915 may be performed in accordance with examples as disclosed herein. In some examples, aspects of the operations of 915 may be performed by a calculation component 735 as described with reference to FIG. 7.

At 920, the method may include estimating a future menstrual cycle onset day that the user experiences a first day of a menstrual cycle based at least in part on applying the duration to a most recent feature of the trigonometric or polynomial function. The operations of 920 may be performed in accordance with examples as disclosed herein. In some examples, aspects of the operations of 920 may be performed by a period onset component 740 as described with reference to FIG. 7.

At 925, the method may include causing a graphical user interface of a user device to display an indication of the estimated future menstrual cycle onset day. The operations of 925 may be performed in accordance with examples as disclosed herein. In some examples, aspects of the operations of 925 may be performed by a user interface component 745 as described with reference to FIG. 7.

Figure 10:
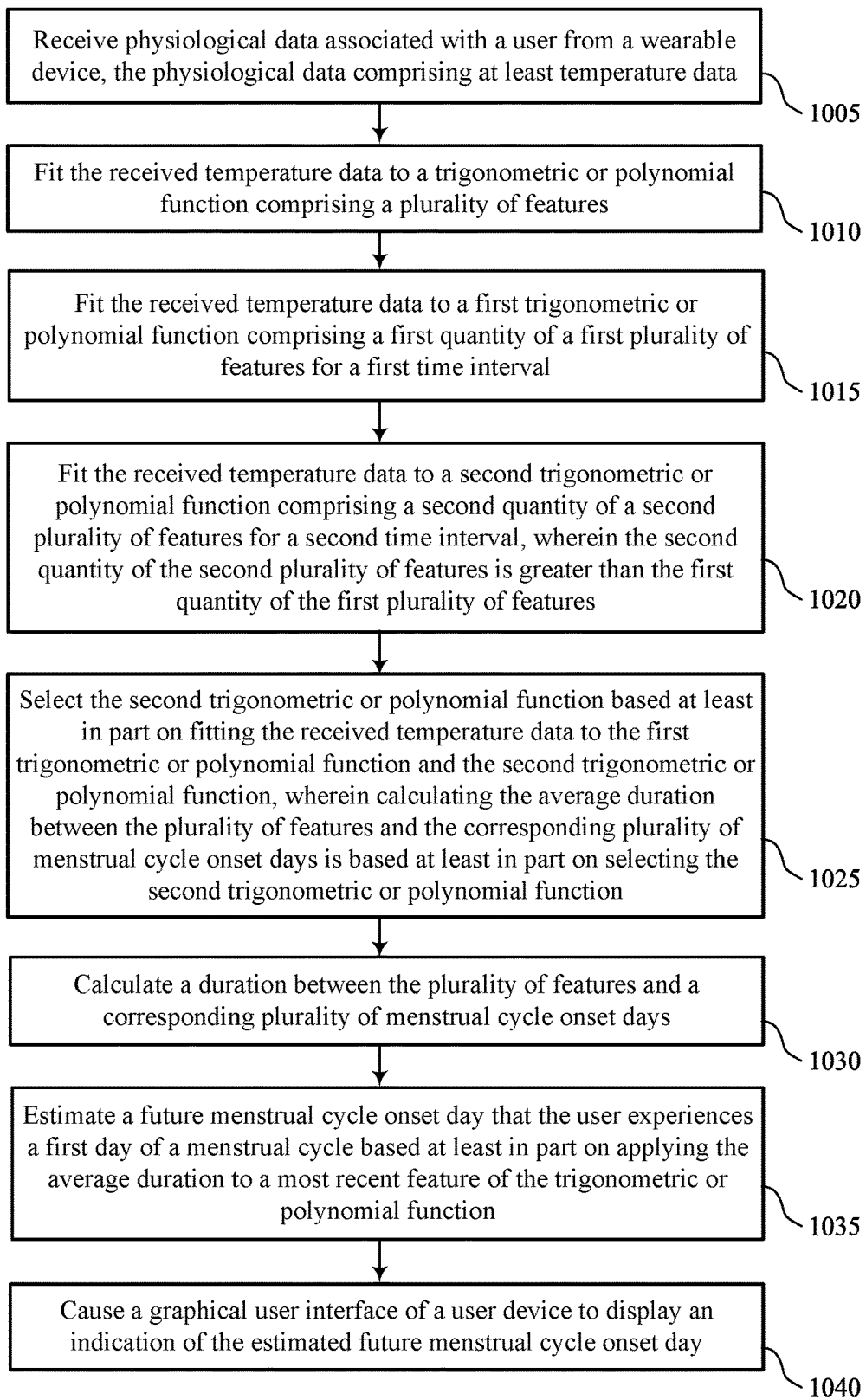

FIG. 10 shows a flowchart illustrating a method 1000 that supports techniques for predicting menstrual cycle onset in accordance with aspects of the present disclosure. The operations of the method 1000 may be implemented by a user device or its components as described herein. For example, the operations of the method 1000 may be performed by a user device as described with reference to FIGS. 1 through 8. In some examples, a user device may execute a set of instructions to control the functional elements of the user device to perform the described functions. Additionally or alternatively, the user device may perform aspects of the described functions using special-purpose hardware.

At 1005, the method may include receiving physiological data associated with a user from a wearable device, the physiological data comprising at least temperature data. The operations of 1005 may be performed in accordance with examples as disclosed herein. In some examples, aspects of the operations of 1005 may be performed by a data acquisition component 725 as described with reference to FIG. 7.

At 1010, the method may include fitting the received temperature data to a trigonometric or polynomial function comprising a plurality of features. The operations of 1010 may be performed in accordance with examples as disclosed herein. In some examples, aspects of the operations of 1010 may be performed by a temperature data component 730 as described with reference to FIG. 7.

At 1015, the method may include fitting the received temperature data to a first trigonometric or polynomial function comprising a first quantity of a first plurality of features for a first time interval. The operations of 1015 may be performed in accordance with examples as disclosed herein. In some examples, aspects of the operations of 1015 may be performed by a temperature data component 730 as described with reference to FIG. 7.

At 1020, the method may include fitting the received temperature data to a second trigonometric or polynomial function comprising a second quantity of a second plurality of features for a second time interval, wherein the second quantity of the second plurality of features is greater than the first quantity of the first plurality of features. The operations of 1020 may be performed in accordance with examples as disclosed herein. In some examples, aspects of the operations of 1020 may be performed by a temperature data component 730 as described with reference to FIG. 7.

At 1025, the method may include selecting the second trigonometric or polynomial function based at least in part on fitting the received temperature data to the first trigonometric or polynomial function and the second trigonometric or polynomial function, wherein calculating the duration between the plurality of features and the corresponding plurality of menstrual cycle onset days is based at least in part on selecting the second trigonometric or polynomial function. The operations of 1025 may be performed in accordance with examples as disclosed herein. In some examples, aspects of the operations of 1025 may be performed by a calculation component 735 as described with reference to FIG. 7.

At 1030, the method may include calculating an duration between the plurality of features and a corresponding plurality of menstrual cycle onset days. The operations of 1030 may be performed in accordance with examples as disclosed herein. In some examples, aspects of the operations of 1030 may be performed by a calculation component 735 as described with reference to FIG. 7.

At 1035, the method may include estimating a future menstrual cycle onset day that the user experiences a first day of a menstrual cycle based at least in part on applying the duration to a most recent feature of the trigonometric or polynomial function. The operations of 1035 may be performed in accordance with examples as disclosed herein. In some examples, aspects of the operations of 1035 may be performed by a period onset component 740 as described with reference to FIG. 7.

At 1040, the method may include causing a graphical user interface of a user device to display an indication of the estimated future menstrual cycle onset day. The operations of 1040 may be performed in accordance with examples as disclosed herein. In some examples, aspects of the operations of 1040 may be performed by a user interface component 745 as described with reference to FIG. 7.

Figure 11:
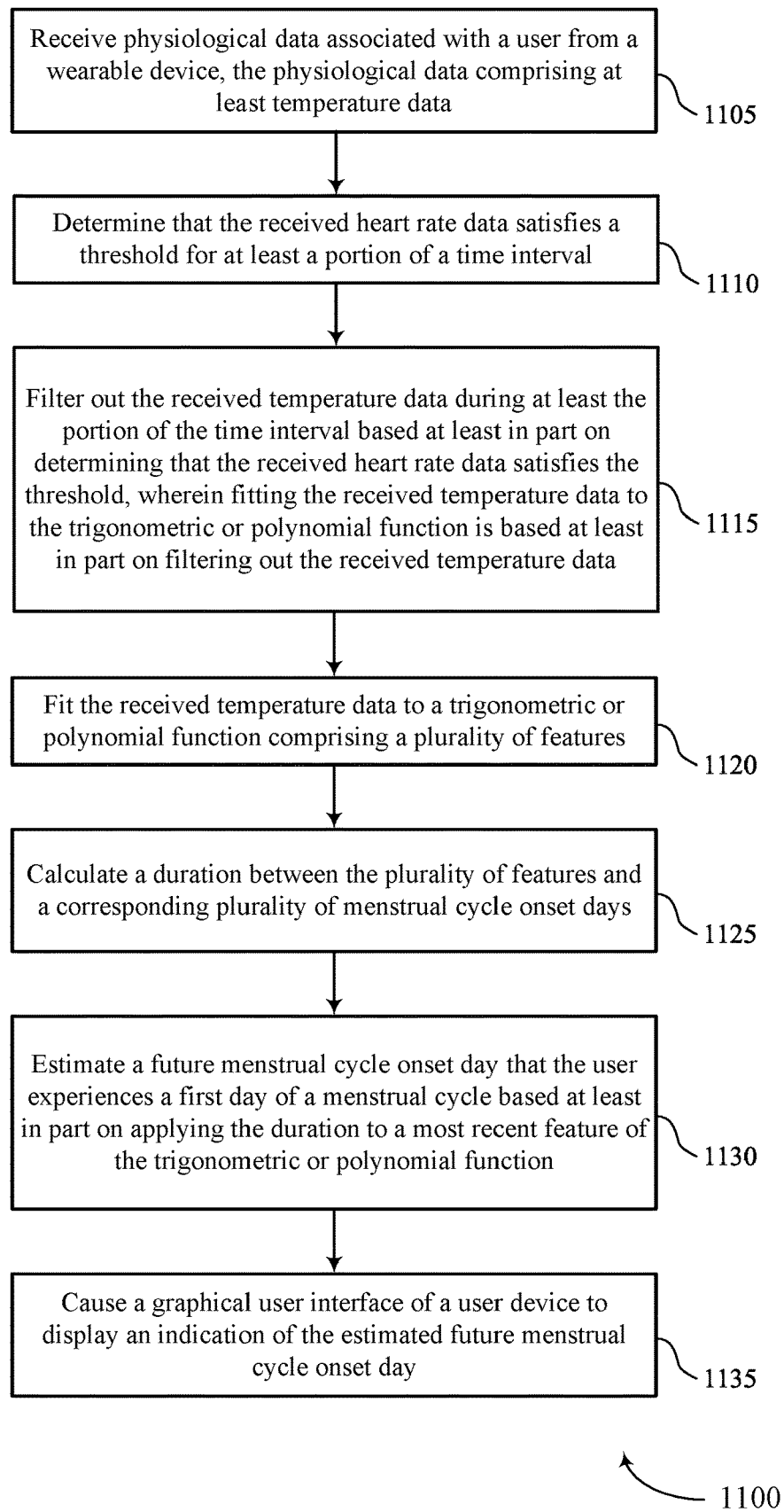

FIG. 11 shows a flowchart illustrating a method 1100 that supports techniques for predicting menstrual cycle onset in accordance with aspects of the present disclosure. The operations of the method 1100 may be implemented by a user device or its components as described herein. For example, the operations of the method 1100 may be performed by a user device as described with reference to FIGS. 1 through 8. In some examples, a user device may execute a set of instructions to control the functional elements of the user device to perform the described functions. Additionally or alternatively, the user device may perform aspects of the described functions using special-purpose hardware.

At 1105, the method may include receiving physiological data associated with a user from a wearable device, the physiological data comprising at least temperature data. The operations of 1105 may be performed in accordance with examples as disclosed herein. In some examples, aspects of the operations of 1105 may be performed by a data acquisition component 725 as described with reference to FIG. 7.

At 1110, the method may include determining that the received heart rate data satisfies a threshold for at least a portion of a time interval. The operations of 1110 may be performed in accordance with examples as disclosed herein. In some examples, aspects of the operations of 1110 may be performed by a heart rate component 750 as described with reference to FIG. 7.

At 1115, the method may include filtering out the received temperature data during at least the portion of the time interval based at least in part on determining that the received heart rate data satisfies the threshold, wherein fitting the received temperature data to the trigonometric or polynomial function is based at least in part on filtering out the received temperature data. The operations of 1115 may be performed in accordance with examples as disclosed herein. In some examples, aspects of the operations of 1115 may be performed by a temperature data component 730 as described with reference to FIG. 7.

At 1120, the method may include fitting the received temperature data to a trigonometric or polynomial function comprising a plurality of features. The operations of 1120 may be performed in accordance with examples as disclosed herein. In some examples, aspects of the operations of 1120 may be performed by a temperature data component 730 as described with reference to FIG. 7.

At 1125, the method may include calculating a duration between the plurality of features and a corresponding plurality of menstrual cycle onset days. The operations of 1125 may be performed in accordance with examples as disclosed herein. In some examples, aspects of the operations of 1125 may be performed by a calculation component 735 as described with reference to FIG. 7.

At 1130, the method may include estimating a future menstrual cycle onset day that the user experiences a first day of a menstrual cycle based at least in part on applying the duration to a most recent feature of the trigonometric or polynomial function. The operations of 1130 may be performed in accordance with examples as disclosed herein. In some examples, aspects of the operations of 1130 may be performed by a period onset component 740 as described with reference to FIG. 7.

At 1140, the method may include causing a graphical user interface of a user device to display an indication of the estimated future menstrual cycle onset day. The operations of 1140 may be performed in accordance with examples as disclosed herein. In some examples, aspects of the operations of 1140 may be performed by a user interface component 745 as described with reference to FIG. 7.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for detecting a menstrual cycle onset, comprising:

causing a graphical user interface of a user device to display a request to activate a menstrual cycle tracking mode of a health-related application;

receiving, in response to the request, a first user input indicating activation of the menstrual cycle tracking mode;

receiving, from a wearable device configured to be worn on a finger of the user, physiological data measured from a user by the wearable device, the physiological data comprising at least distal temperature data and heart rate data, wherein the wearable device comprises one or more temperature sensors configured to interface with a skin surface of the finger of the user to measure the distal temperature data continuously for at least a plurality of days, and wherein the distal temperature data captures a higher degree of body temperature fluctuations as compared to a core temperature associated with the user;

training a machine learning classifier in a first training stage to estimate a first future menstrual cycle onset day that the user experiences a first day of a menstrual cycle based at least in part on inputting the physiological data into the machine learning classifier and inputting one or more user inputs confirming a previous menstrual cycle onset day;

filtering out at least a first portion of the received distal temperature data corresponding to a time interval for which the received heart rate satisfies a threshold;

fitting a second portion of the received distal temperature data measured for at least the plurality of days to a trigonometric or polynomial function comprising a plurality of features based at least in part on filtering out at least the first portion of the received distal temperature data, wherein the second portion of the received distal temperature data excludes the first portion of the received distal temperature data based at least in part on the filtering;

receiving, via the user device, an indication of a corresponding plurality of menstrual cycle onset days for at least a plurality of months after fitting the second portion of the received distal temperature data to the trigonometric or polynomial function and an indication of a respective set of one or more symptoms experienced by the user prior to at least a subset of the plurality of menstrual cycle onset days;

calculating, after receiving the indication of the corresponding plurality of menstrual cycle onset days, a duration between the plurality of features and the corresponding plurality of menstrual cycle onset days based at least in part on fitting the second portion of the received distal temperature data to the trigonometric or polynomial function;

identifying one or more trends between the sets of one or more symptoms and the at least subset of the plurality of menstrual cycle onset days;

estimating, using the machine learning classifier, a range of first future menstrual cycle onset days based at least in part on applying the duration to a most recent feature of the trigonometric or polynomial function;

causing a graphical user interface of the user device to display a user interface page of a health-related application, the user interface page comprising an indication of the range of first future menstrual cycle onset days, an indication of a current day of a current menstrual cycle of the user, an indication of a current menstrual cycle phase of the current menstrual cycle, and a graphical representation of the second portion of the received distal temperature data that illustrates a change associated with a first temperature value of the user associated with a previous day of the plurality of days and a second temperature value of the user associated with a current day;

causing the graphical user interface to display one or more activity recommendations for the user, wherein the one or more activity recommendations are based at least in part on the current menstrual cycle phase and on the physiological data;

receiving, via the graphical user interface of the user device, a first user input comprising an indication of one or more current symptoms experienced by the user;

estimating, using the machine learning classifier, the first future menstrual cycle onset day within the range of first future menstrual cycle onset days based at least in part on the one or more current symptoms and the one or more trends;

receiving, via the graphical user interface of the user device, a second user input comprising an indication of an actual menstrual cycle onset day that confirms or denies whether the user experienced the first future menstrual cycle onset day;

retraining the machine learning classifier in a second training stage to estimate a plurality of future menstrual cycle onset days based at least in part on inputting both the first user input comprising an indication of one or more current symptoms experienced by the user and the second user input comprising the indication of the actual menstrual cycle onset day into the machine learning classifier; and estimating, using the machine learning classifier, the plurality of future menstrual cycle onset days based at least in part on retraining the machine learning classifier in the second training stage.

2. The method of claim 1, wherein fitting the second portion of the received distal temperature data to a trigonometric or polynomial function comprises:

fitting the second portion of the received distal temperature data to a first trigonometric or polynomial function comprising a first quantity of a first plurality of features for a first time interval;

fitting the second portion of the received distal temperature data to a second trigonometric or polynomial function comprising a second quantity of a second plurality of features for a second time interval, wherein the second quantity of the second plurality of features is greater than the first quantity of the first plurality of features; and selecting the second trigonometric or polynomial function based at least in part on fitting the second portion of the received distal temperature data to the first trigonometric or polynomial function and the second trigonometric or polynomial function, wherein calculating the duration between the plurality of features and the corresponding plurality of menstrual cycle onset days is based at least in part on selecting the second trigonometric or polynomial function.

3. The method of claim 1, further comprising:
determining that the received heart rate data satisfies the threshold for the time interval.

4. The method of claim 1, further comprising:
identifying a baseline temperature associated with the user based at least in part on receiving the physiological data, wherein the baseline temperature comprises a nighttime temperature baseline;

determining that a temperature deviation from the baseline temperature satisfies a threshold during at least a portion of a time interval based at least in part on identifying the baseline temperature; and filtering out at least a first portion of the received distal temperature data corresponding to a time interval for which the temperature deviation satisfies the threshold, wherein fitting the second portion of the received distal temperature data to the trigonometric or polynomial function is based at least in part on filtering out the received distal temperature data.

5. The method of claim 1, wherein the received distal temperature data is continuously collected by the wearable device.

6. The method of claim 1, wherein estimating the first future menstrual cycle onset day is based at least in part on receiving the indication of the corresponding plurality of menstrual cycle onset days.

7. The method of claim 1, further comprising:
estimating a future temperature data based at least in part on fitting the second portion of the received distal temperature data to the trigonometric or polynomial function, wherein estimating the first future menstrual cycle onset day is based at least in part on estimating the future temperature data.

8. The method of claim 1, further comprising:
identifying that the received distal temperature data satisfies a threshold for at least a portion of a time interval based at least in part on fitting the second portion of the received distal temperature data to the trigonometric or polynomial function; and estimating a future luteal onset phase of the menstrual cycle during the portion of the time interval based at least in part on identifying that the received distal temperature data satisfies the threshold, wherein estimating the first future menstrual cycle onset day is based at least in part on estimating the future luteal onset phase of the menstrual cycle.

9. The method of claim 8, further comprising:
estimating a future ovulation day based at least in part on estimating the future luteal onset phase of the menstrual cycle.

10. The method of claim 1, further comprising:
updating a Readiness Score associated with the user based at least in part on the first future menstrual cycle onset day.

11. The method of claim 1, further comprising:
inputting the physiological data into the machine learning classifier, wherein estimating the first future menstrual cycle onset day is based at least in part on inputting the physiological data into the machine learning classifier.

12. The method of claim 1, further comprising:
receiving, via the user device and in response to estimating the first future menstrual cycle onset day, a confirmation of the first future menstrual cycle onset day.

13. The method of claim 1,
wherein the user interface page further comprises an indication of a value associated with the change in the temperature of the user relative to the previous day.

14. The method of claim 1, further comprising:
switching to a second method to estimate the first future menstrual cycle onset day based at least in part on a value of a reliability associated with the received distal temperature data falling below a reliability threshold.

15. The method of claim 14, wherein the second method to estimate the first future menstrual cycle onset day comprises a calendar method.

16. The method of claim 1, further comprising:
causing the graphical user interface of the user device to display a message associated with the first future menstrual cycle onset day.

17. The method of claim 16, wherein the message comprises a time of day that the first future menstrual cycle onset day is predicted to occur, a duration between the first future menstrual cycle onset day and a previous menstrual cycle onset day, a time interval that the first future menstrual cycle onset day is predicted to occur, a request to input symptoms associated with the first future menstrual cycle onset day, or a combination thereof.

18. The method of claim 1, wherein the trigonometric or polynomial function comprises a sinusoidal function, a cosine function, a tangent function, a second degree polynomial function, or a third degree polynomial function.

19. The method of claim 1, wherein the plurality of features comprises a plurality of local maximum values, a plurality of local minimum values, or an axis intercept.

20. The method of claim 1, wherein the wearable device comprises a wearable ring device.

* * * * *